US011778176B2

(12) United States Patent
Xu et al.

(10) Patent No.: US 11,778,176 B2
(45) Date of Patent: Oct. 3, 2023

(54) INTRA BLOCK COPY BUFFER AND PALETTE PREDICTOR UPDATE

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Kai Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/947,909

(22) Filed: Sep. 19, 2022

(65) Prior Publication Data

US 2023/0020259 A1    Jan. 19, 2023

Related U.S. Application Data

(63) Continuation of application No. PCT/CN2021/081469, filed on Mar. 18, 2021.

(30) Foreign Application Priority Data

Mar. 18, 2020  (WO) ............... PCT/CN2020/079858

(51) Int. Cl.
  *H04N 19/11*   (2014.01)
  *H04N 19/159*  (2014.01)
(Continued)

(52) U.S. Cl.
  CPC .......... *H04N 19/11* (2014.11); *H04N 19/105* (2014.11); *H04N 19/132* (2014.11);
(Continued)

(58) Field of Classification Search
  CPC .... H04N 19/11; H04N 19/105; H04N 19/176; H04N 19/593
  See application file for complete search history.

(56) References Cited

U.S. PATENT DOCUMENTS 9,860,559 B2    1/2018  Zhang et al.
9,877,043 B2    1/2018  He et al.
(Continued)

FOREIGN PATENT DOCUMENTS

CN    105847795 A    8/2016
CN    106797466 A    5/2017
(Continued)

OTHER PUBLICATIONS

Bitstream conformance with a virtual IBC buffer concept; Xu; et al.—Jul. 2019. (Year: 2019).*
(Continued)

*Primary Examiner* — Luis Perez-Fuentes
(74) *Attorney, Agent, or Firm* — Conley Rose, P.C.

(57) ABSTRACT

Methods and apparatus for video processing are described. One example method includes determining, for a conversion between a video block of a video and a bitstream of the video, that the video block satisfies a condition. The video block is coded in the bitstream using an intra block copy mode. The method further includes performing the conversion based on the determining. Here, due to the video block satisfying the condition, a portion of an intra block copy buffer is reset during the conversion.

19 Claims, 12 Drawing Sheets

US 11,778,176 B2
Page 2

(51) Int. Cl.
*H04N 19/593* (2014.01)
*H04N 19/105* (2014.01)
*H04N 19/132* (2014.01)
*H04N 19/176* (2014.01)
*H04N 19/52* (2014.01)

(52) U.S. Cl.
CPC ......... *H04N 19/159* (2014.11); *H04N 19/176* (2014.11); *H04N 19/593* (2014.11); *H04N 19/52* (2014.11)

(56) References Cited

U.S. PATENT DOCUMENTS

| | | | |
|---|---|---|---|
| 10,178,403 B2 | 1/2019 | Seregin et al. | |
| 10,284,874 B2 | 5/2019 | He et al. | |
| 10,412,387 B2 | 9/2019 | Pang et al. | |
| 10,516,882 B2 | 12/2019 | He et al. | |
| 10,582,213 B2 | 3/2020 | Li et al. | |
| 10,728,573 B2* | 7/2020 | Sun | H04N 19/82 |
| 11,006,130 B2* | 5/2021 | Xiu | H04N 19/126 |
| 11,533,507 B2* | 12/2022 | Xu | H04N 19/132 |
| 11,575,888 B2* | 2/2023 | Xu | H04N 19/132 |
| 11,575,889 B2* | 2/2023 | Xu | H04N 19/105 |
| 11,638,004 B2* | 4/2023 | Xu | H04N 19/96 375/240.16 |
| 2015/0264396 A1 | 9/2015 | Zhang et al. | |
| 2016/0255344 A1* | 9/2016 | Lee | H04N 19/157 375/240.13 |
| 2017/0150176 A1 | 5/2017 | Zhang et al. | |
| 2017/0230685 A1 | 8/2017 | Gisquet et al. | |
| 2017/0289566 A1 | 10/2017 | He et al. | |
| 2017/0295379 A1 | 10/2017 | Sun et al. | |
| 2017/0347093 A1 | 11/2017 | Yu et al. | |
| 2018/0091825 A1 | 3/2018 | Zhao et al. | |
| 2018/0098079 A1 | 4/2018 | Chuang et al. | |
| 2018/0146191 A1 | 5/2018 | Jiang et al. | |
| 2019/0200038 A1 | 6/2019 | He et al. | |
| 2019/0208217 A1 | 7/2019 | Zhou et al. | |
| 2019/0238849 A1 | 8/2019 | Fang | |
| 2019/0246143 A1 | 8/2019 | Zhang et al. | |
| 2020/0077087 A1 | 3/2020 | He et al. | |
| 2020/0396465 A1 | 12/2020 | Zhang et al. | |
| 2020/0404255 A1 | 12/2020 | Zhang et al. | |
| 2020/0404260 A1 | 12/2020 | Zhang et al. | |
| 2020/0413048 A1 | 12/2020 | Zhang et al. | |
| 2021/0014504 A1 | 1/2021 | Xu et al. | |
| 2021/0112243 A1 | 4/2021 | Xu et al. | |
| 2021/0152833 A1 | 5/2021 | Gao et al. | |
| 2021/0314560 A1 | 10/2021 | Lai et al. | |
| 2021/0400304 A1 | 12/2021 | Gao et al. | |
| 2022/0030223 A1 | 1/2022 | Chen et al. | |
| 2022/0132105 A1* | 4/2022 | Xu | H04N 19/423 |
| 2022/0150476 A1* | 5/2022 | Xu | H04N 19/176 |
| 2022/0150540 A1 | 5/2022 | Xu et al. | |
| 2022/0159246 A1 | 5/2022 | Zhang et al. | |
| 2022/0166998 A1 | 5/2022 | Lim et al. | |
| 2022/0182662 A1 | 6/2022 | Kang et al. | |
| 2022/0191475 A1* | 6/2022 | Xu | H04N 19/132 |
| 2022/0224887 A1* | 7/2022 | Xu | H04N 19/70 |

FOREIGN PATENT DOCUMENTS

| | | |
|---|---|---|
| CN | 106797479 A | 5/2017 |
| CN | 107211155 A | 9/2017 |
| CN | 107646195 A | 1/2018 |
| JP | 2017507554 A | 3/2017 |
| JP | 2017535150 A | 11/2017 |
| JP | 2020017970 A | 1/2020 |
| WO | 2019125093 A1 | 6/2019 |

OTHER PUBLICATIONS

Bitstream conformance with a virtual IBC buffer concept; Gao; et al.—Jul. 2019. (Year: 2019).*

Alternative IBC virtual buffer setting to avoid reference sample wrapping around; Xu; 2019. (Year: 2019).*
Document: JVET-M0407-v3, Xu, X., et al., "CE8: CPR reference memory reuse without increasing memory requirement (CE8.1.2a and CE8.1.2d)," Joint Video Experts Team (JVET) of ITU-T SG 16 WP 3 and ISO/IEC JTC 1/SC 29/WG 11 13th Meeting: Marrakesh, MA, Jan. 9-18, 2019, 10 pages.
Suehring, K., Retrieved from the internet: https://vcgit.hhi.fraunhofer.de/jvet/VVCSoftware_VTM/tags/VTM-8.0, Dec. 7, 2022, 2 pages.
Document: JVET-L0297-v1, Xu, X., et al., "CE8-related: CPR mode with local search range optimization," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-M0408-v3, Xu, X., et al., "CE8: CPR reference memory reuse with reduced memory requirement (CE8.1.2b and CE8.1.2c)," Joint Video Experts Team (JVET) of ITU-T SG 16 WP 3 and ISO/IEC JTC 1/SC 29/WG 11 13th Meeting: Marrakesh, MA, Jan. 9-18, 2019, 10 pages.
ISO/IEC "Information technology—High efficiency coding and media delivery in heterogeneous environments—Part 2: High Efficiency Video Coding," Rec. ITU-T H.265 | ISO/IEC 23008-2, ISO/IEC JTC 1/SC 29/WG 11 N 17661, Apr. 20, 2018, 8 pages.
Document: JVET-P1018-v2, Xu, J., et al., "Non-CE8: An alternative IBC virtual buffer setting to avoid reference sample wrapping around," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Foreign Communication From A Related Counterpart Application, International Application No. PCT/CN2021/081469, International Search Report dated Jun. 17, 2021, 13 pages.
Lu et al. "CE12: Mapping Functions {test CE12-1 and CE12-2)," Joint Video Experts Team (JVET) of ITU-T SG 16 WP and ISO/IEC JTC 1/SC 29/WG 11 13th Meeting: Marrakech, MA, Jan. 9-18, 2019, document JVET-M0427, 2019.
Bross et al. "Versatile Video Coding (Draft 3)," Joint Video Experts Team (JVET) of ITU-T SG 16 WP 3 and ISO/IEC JTC 1/SC 29/WG 1112th Meeting: Macao, CN, Oct. 3-12, 2018, document JVET-L1001, 2018.
Chang et al. "AHGB: Support for Reference Picture Resampling—Handling of Resampling, TMVP, DMVR, and BDOF," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0134, 2019.
Xu et al. "An Implementation of JVET-O0568 Based on the IBC Buffer Design of JVET-O0127," Joint Video Experts Team (JVET of ITU-T SG 16 WP 3 and ISO/IEC JTC 1/SC 29/WG 1115th Meeting: Gothenburg, SE, Jul. 3-12, 2019, document JVET-O1161, 2019.
Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document VET-N0236, 2019.
Chen et al. "Algorithm Description for Versatile Video Coding and Test Model 6 (VTM 6)," Joint Video Experts Team JVET) of ITU-T SG 16 WP 3 and ISO/IEC JTC 1/SC 29/WG 11 15th Meeting: Gothenburg, SE, Jul. 3-12, 2019, document JVET-O2002, 2019.
Xu et al. "Intra Block Copy in Versatile Video Coding with Reference Sample Memory Reuse," IEEE, Picture Coding Symposium, Ningbo China, Nov. 2019.
Tsang et al. "Reduced-Complexity Intra Block Copy (IntraBC) Mode with Early CU Splitting and Pruning for HEVC Screen Content Coding," IEEE Transactions on Multimedia, Feb. 2019, 21(2):269-283.
Document JVET-O0248, Gao et al. "CE8-Related: Dedicated IBC Reference Buffer without Bitstream Restrictions," Joint Video Experts Team (JVET) of ITU-T SG 16 WP 3 and ISO/IEC JTC 1/SC 29/WG 11, 15th Meeting, Gothenburg, SE, Jul. 3-12, 2019.
Li et al. "CE8-Related: IBC Modifications," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0127, 2019.
Xu et al. "Non-CE8: IBC Search Range Increase for Small CTU Size," Joint Video Experts Team (JVET) of ITU-T SG 3 WP 3 and

(56) References Cited

OTHER PUBLICATIONS

ISO/IEC JTC 1/SC 29/WG 11 14th Meeting, Geneva, CH, Mar. 19-27, 2019, document JVET-N0384, 2019.
Document: JVET-O1170-v1, Xu, J., et al., "Bitstream conformance with a virtual IBC buffer concept," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.
Xu et al. "Intra Block Copy in HEVC Screen Content Coding Extensions," IEEE Journal on Emerging and Selected Topics in Circuits and Systems, Dec. 2016, 6(4):409-419.
Gao et al. "Bitstream Conformance with a Virtual IBC Buffer Concept," Joint Video Experts Team {JVET) of ITU-T SG 16 WP 3 and ISO/IEC JTC 1/SC 29/WG 11, 15th Meeting, Gothenburg, SE, Jul. 3-12, 2019, document JVET-O1171, 2019.
Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
Bross et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019.
International Search Report and Written Opinion from International Patent Application No. PCT/CN2020/113674 dated Dec. 8, 2020 (9 pages).
International Search Report and Written Opinion from International Patent Application No. PCT/CN2020/116959 dated Dec. 14, 2020 (12 pages).
Non Final Office Action from U.S. Appl. No. 17/582,447 dated Apr. 20, 2022.
Non Final Office Action from U.S. Appl. No. 17/702,318 dated Jul. 26, 2022.
Notice of Allowance from U.S. Appl. No. 17/582,447 dated Aug. 3, 2022.
Extended European Search Report from European Patent No. 20869512.2 dated Oct. 14, 2022 (12 pages).
International Search Report and Written Opinion from International Patent Application No. PCT/CN2020/104081 dated Oct. 28, 2020 (11 pages).
International Search Report and Written Opinion from International Patent Application No. PCT/CN2020/104084 dated Oct. 28, 2020 (12 pages).
Extended European Search Report from European Patent No. 20844494.3 dated Aug. 2, 2022 (11 pages).
Indian Office Action from Indian Application 202227004306 dated Jul. 13, 2022 (6 pages).
Final Office Action from U.S. Appl. No. 17/582,351 dated Aug. 16, 2022.
Non Final Office Action from U.S. Appl. No. 17/582,351 dated Apr. 12, 2022.
Extended European Search Report from European Patent No. 20844875.3 dated Aug. 9, 2022 (13 pages).

* cited by examiner

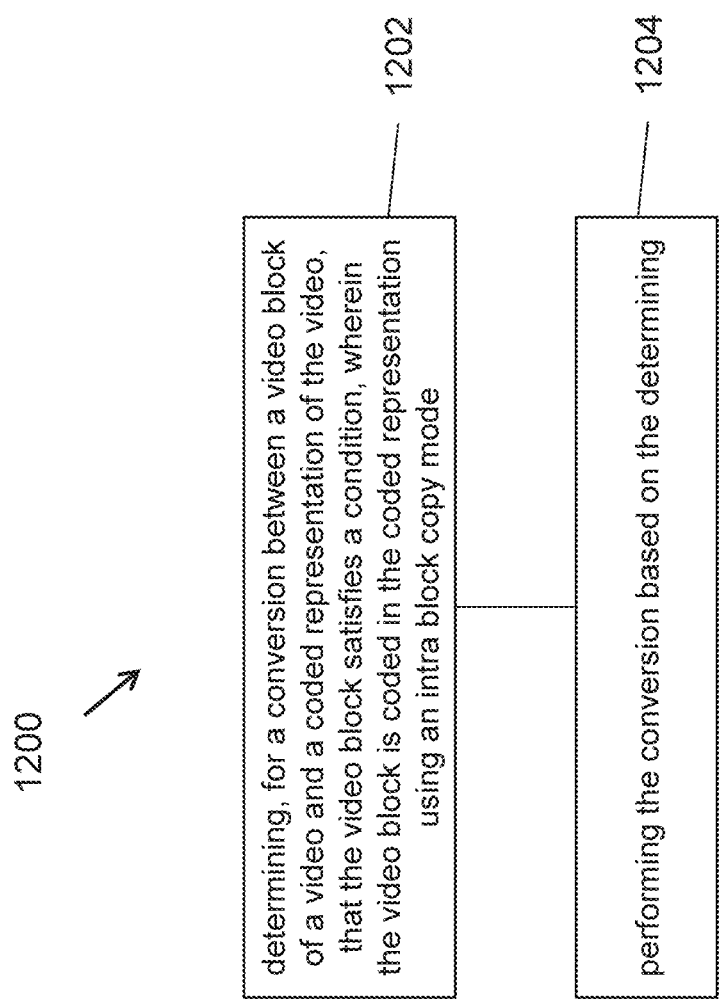

ND PALETTE PREDICTOR UPDATE

INTRA BLOCK COPY BUFFER AND PALETTE PREDICTOR UPDATE

CROSS REFERENCE TO RELATED APPLICATIONS

This application is a continuation of International Patent Application No. PCT/CN2021/081469 filed on Mar. 18, 2021, which claims the priority to and benefits of International Patent Application No. PCT/CN2020/079858 filed on Mar. 18, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes determining, for a conversion between a video block of a video and a coded representation of the video, that the video block satisfies a condition, wherein the video block is coded in the coded representation using an intra block copy mode; and performing the conversion based on the determining. During the conversion, due to the video block satisfying the condition, a portion of an intra block copy buffer is reset.

In another example aspect, another video processing method is disclosed. The method includes performing a conversion between one or more video blocks of a video and a coded representation of the video. The one or more video blocks are coded using a palette of representative samples. The palette is predictively coded in the coded representation using a palette predictor, and the palette predictor is updated prior to use for processing each of the one or more video blocks.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code, upon execution by a processor, causes the process to implement an above-described method.

In yet another example aspect, a method of generating a bitstream according to an above-described method is described. The bitstream may be stored on a computer-readable medium after generation.

These, and other, features are described throughout the present document.

BRIEF DESCRIPTION OF DRAWINGS

FIG. 12 is a flowchart for an example method of video processing.

DETAILED DESCRIPTION

Figure 1:
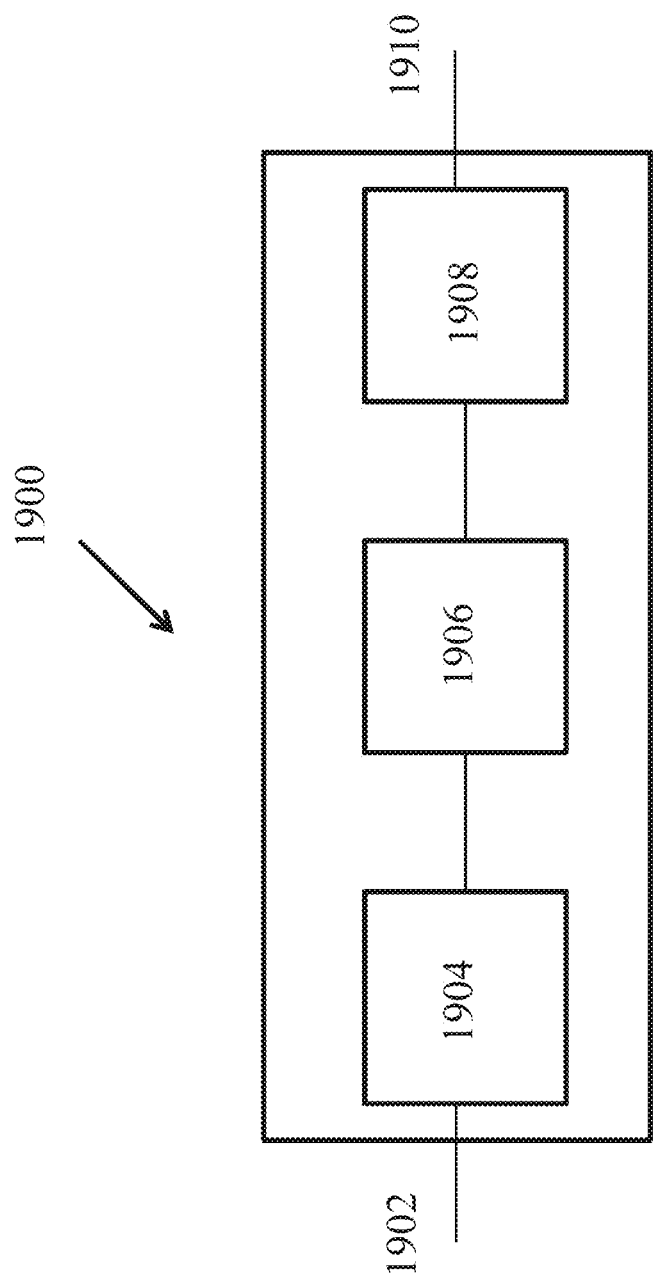
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Initial Discussion

This patent document is related to video coding technologies. Specifically, it is related to intra block copy in video coding. It may be applied to the standard under development, e.g. Versatile Video Coding (VVC). It may be also applicable to future video coding standards or video codecs.

2. Video Coding Introduction

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 8) could be found at:

phenix.int-evry.fr/jvet/doc_end_user/documents/17_Brussels/wg11/JVET-Q2001-v15.zip.

The latest reference software of VVC, named VTM, could be found at:

vcgit.hhi.fraunhofer.de/jvet/VVCSoftware_VTM/tags/VTM-8.0.

2.1. Inter Prediction in HEVC/H.265

Each inter-predicted prediction unit (PU) has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a coding unit (CU) is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2. Current Picture Referencing

Figure 7:
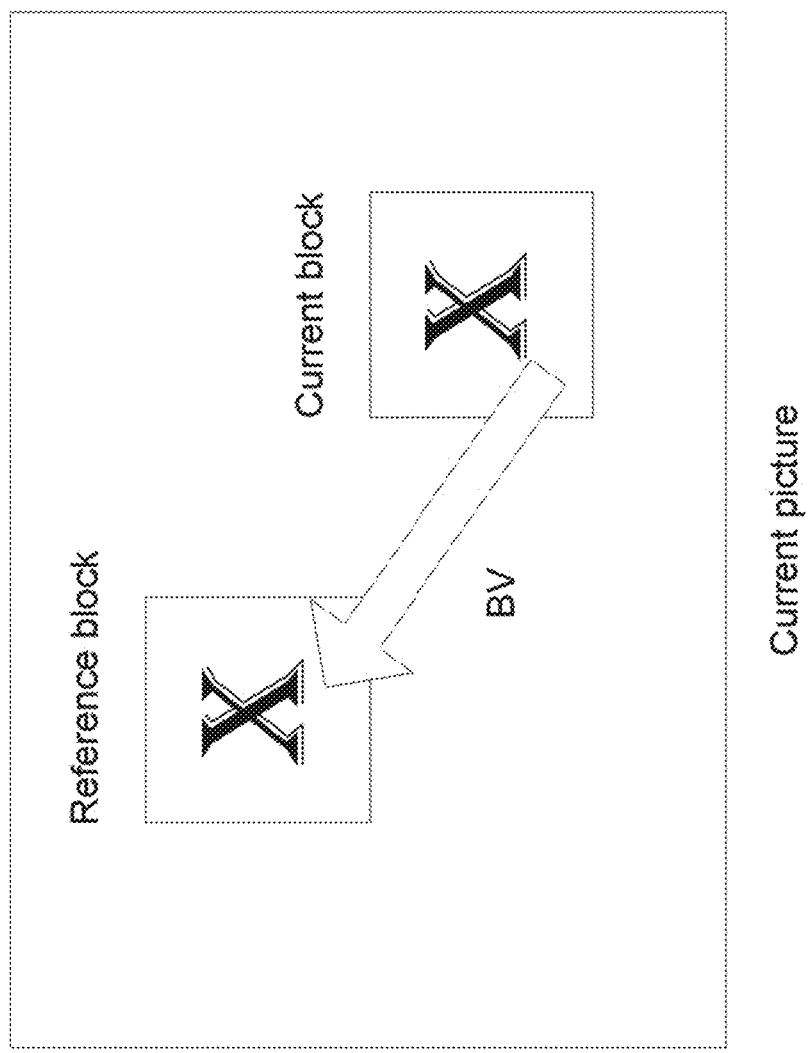
FIG. 7 shows an example illustration of Current Picture Referencing.

Current Picture Referencing (CPR), or once named as Intra Block Copy (IBC), has been adopted in HEVC Screen Content Coding extensions (HEVC-SCC) [1] and the current VVC test model (VTM-3.0) [2]. IBC extends the concept of motion compensation from inter-frame coding to intra-frame coding. As demonstrated in FIG. 7, the current block is predicted by a reference block in the same picture when CPR is applied. The samples in the reference block must have been already reconstructed before the current block is coded or decoded. Although CPR is not so efficient for most camera-captured sequences, it shows significant coding gains for screen content. The reason is that there are lots of repeating patterns, such as icons and text characters in a screen content picture. CPR can remove the redundancy between these repeating patterns effectively. In HEVC-SCC, an inter-coded coding unit (CU) can apply CPR if it chooses the current picture as its reference picture. The motion vector (MV) is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/three dimensional (3D) video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3. CPR in HEVC Screen Content Coding Extensions

In the screen content coding extensions of HEVC, when a block uses current picture as reference, it should guarantee that the whole reference block is within the available reconstructed area, as indicated in the following spec text:

The variable offsetX and offsetY are derived as follows:

$$\text{offset}X = (\text{ChromaArrayType}==0)?0:(\text{mvCLX}[0]\&0x7?2:0) \quad (8\text{-}104)$$

$$\text{offset}Y = (\text{ChromaArrayType}==0)?0:(\text{mvCLX}[0]\&0x7?2:0) \quad (8\text{-}105)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both of the following conditions shall be true:

The value of (mvLX[0]>>2)+nPbW+xB1+offsetX is less than or equal to 0.

The value of (mvLX[1]>>2)+nPbH+yB1+offsetY is less than or equal to 0.

The following condition shall be true $$(xPb+(mvLX[0]>>2)+nPbSw-1+\text{offset}X)/\text{CtbSize}Y-x\\Cb(\text{CtbSize}Y<=yCb/\text{CtbSize}Y-(yPb+(\text{Mv-}\\LX[1]>>2)+nPbSh-1-\text{offset}Y)/\text{CtbSize}Y \quad (8\text{-}106)$$

Thus, the case that the reference block overlaps with the current block or the reference block is outside of the picture will not happen. There is no need to pad the reference or prediction block.

2.4. CPR/IBC in VVC Test Model

In the current VVC test model, i.e. VTM-3.0 design, the whole reference block should be with the current coding tree unit (CTU) and does not overlap with the current block. Thus, there is no need to pad the reference or prediction block.

When dual tree is enabled, the partition structure may be different from luma to chroma CTUs. Therefore, for the 4:2:0 colour format, one chroma block (e.g., CU) may correspond to one collocated luma region which have been split to multiple luma CUs.

The chroma block could only be coded with the CPR mode when the following conditions shall be true:
1) each of the luma CU within the collocated luma block shall be coded with CPR mode
2) each of the luma 4×4 block' BV is firstly converted to a chroma block's BV and the chroma block's BV is a valid BV.

If any of the two condition is false, the chroma block shall not be coded with CPR mode.

It is noted that the definition of 'valid BV' has the following constraints:
1) all samples within the reference block identified by a BV shall be within the restricted search range (e.g., shall be within the same CTU in current VVC design).
2) all samples within the reference block identified by a BV have been reconstructed.

2.5. CPR/IBC in JVET-L0297/JVET-M0407/JVET-M0408

In VTM3.0, the reference area for CPR/IBC is restricted to the current CTU, which is up to 128×128. NET-L0297/NET-M0407/NET-M0408 present methods to dynamically change the reference area to reuse memory to store reference samples for CPR/IBC so that a CPR/IBC block can have more reference candidate while the reference buffer for CPR/IBC can be kept or reduced from one CTU.

Figure 8:
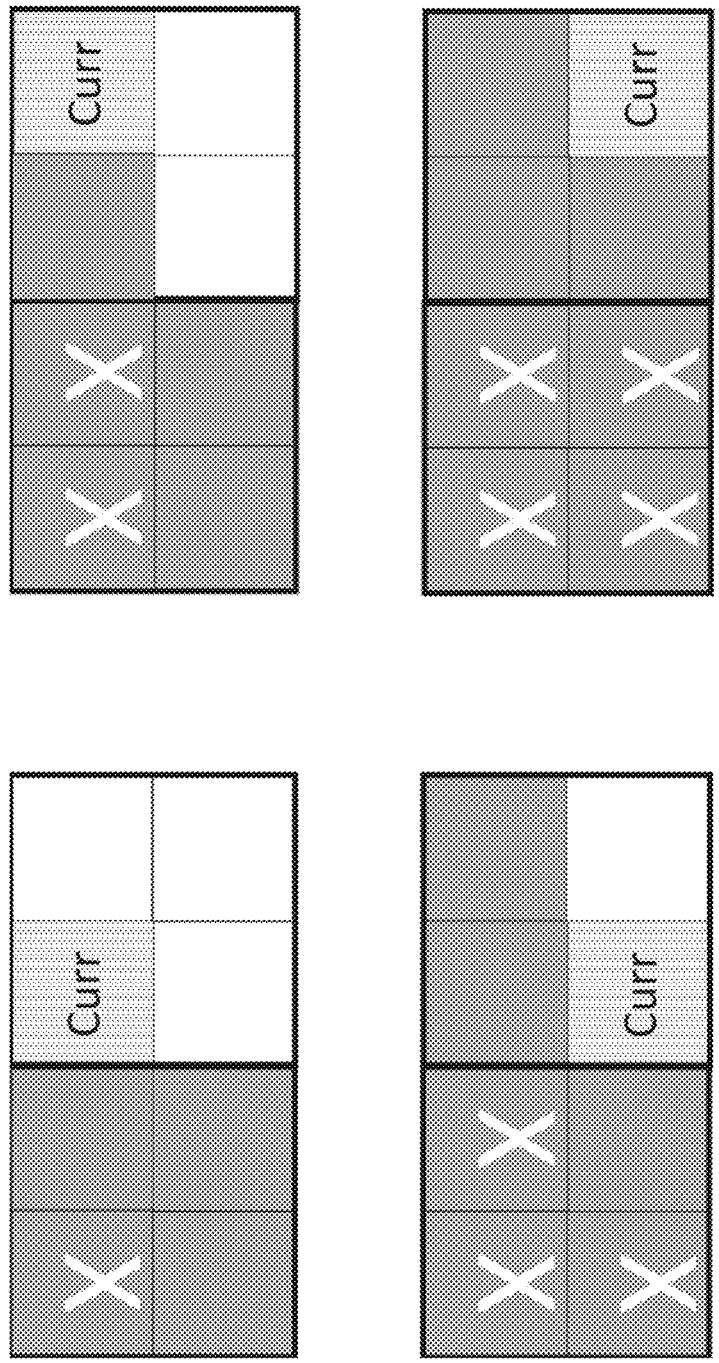
FIG. 8 shows an example of a dynamic reference area shown in Joint Video Experts Team (JVET)-M0407.

FIG. 8 shows a method, where a block is of 64×64 and a CTU contains 4 64×64 blocks. When coding a 64×64 blocks, previous 3 64×64 blocks can be used as reference. By doing so, a decoder just needs to store 4 64×64 blocks to support CPR/IBC. The above method was adopted into VTM4.0.

Suppose that the current luma CU's position relative to the upper-left corner of the picture is (x, y) and block vector is (BVx, BVy). In the current design, if the BV is valid can be told by that the luma position ((x+BVx)>>6<<6+(1<<7), (y+BVy)>>6<<6) has not been reconstructed and ((x+BVx)>>6<<6+(1<<7), (y+BVy)>>6<<6) is not equal to (x>>6<<6, y>>6<<6).

2.6. Virtual IBC Buffer Proposed in JVET-O1170

A virtual buffer concept is introduced to help describing the reference region for IBC prediction mode. For CTU size being ctbSize, we denote wIbcBuf=128*128/ctbSize and define a virtual IBC buffer, ibcBuf, with width being wIbcBuf and height being ctbSize. Thus, For CTU size being 128×128, the size of ibcBuf is also 128×128.
For CTU size being 64×64, the size of ibcBuf is 256×64.
For CTU size being 32×32, the size of ibcBuf is 512×32.

It is noted that virtual pipeline data unit (VPDU) width and height are min(ctbSize, 64). We denote $W_v$=min(ctbSize, 64).

The virtual IBC buffer, ibcBuf is maintained as follows.
1) At the beginning of decoding each CTU row, refresh the whole ibcBuf with value (−1).
2) At the beginning of decoding a VPDU (xVPDU, yVPDU) relative to the top-left corner of the picture, set the ibcBuf[x][y]=−1, with x=xVPDU % wIbcBuf, ..., xVPDU % wIbcBuf+$W_v$−1; y=yVPDU % ctbSize, ..., yVPDU % ctbSize+$W_v$−1.
3) After decoding a CU contains (x, y) relative to the top-left of the picture, set ibcBuf[x % wIbcBuf][y % ctbSize]=recSample[x][y]

So a bitstream constrain can be simply described as
It is a requirement of bitstream conformance that for a bv, ibcBuf[(x+bv[0])% wIbcBuf][(y+bv[1])% ctbSize] shall not be equal to −1.

With the concept of IBC reference buffer, it also simplifies the text for the decoding process by avoid reference to the inter interpolation and motion compensation process, including subblock process.

2.7. VPDU

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM5:
TT split is not allowed for a CU with either width or height, or both width and height equal to 128.
For a 128×N CU with N≤64 (i.e. width equal to 128 and height smaller than 128), horizontal BT is not allowed.
For an N×128 CU with N≤64 (i.e. height equal to 128 and width smaller than 128), vertical BT is not allowed.

In VVC, generally it is agreed that the width and height of a VPDU is min(64, CtbSizeY) in luma samples. So for coding tree block (CTB)/CTU size being 64×64, 128×128 or 256×256, VPDU size is 64×64. For CTB/CTU size being 32×32, VPDU size is 32×32.

2.8. Buffer Management and Block Vector Coding for Intra Block Copy in our IDFs P1809118901H and P1907355701H In those IDFs, various IBC buffer and corresponding management are described.

2.9. Current Text on IBC in JVET-Q2001-vE 8.6.2 Decoding Process for Coding Units Coded in IBC Prediction Mode
8.6.2.1 General Decoding Process for Coding Units Coded in IBC Prediction Mode
Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The variable IsGt4by4 is derived as follows:

$$IsGt4by4=(cbWidth*cbHeight)>16 \tag{1111}$$

The decoding process for coding units coded in IBC prediction mode consists of the following ordered steps:

1. The block vector components of the current coding unit are derived as follows:
   The derivation process for block vector components as specified in clause 8.6.2.1 is invoked with the luma coding block location (xCb, yCb), the luma coding block width cbWidth and the luma coding block height cbHeight as inputs, and the luma block vector bvL as output.
   When treeType is equal to SINGLE_TREE, the derivation process for chroma block vectors in clause 8.6.2.5 is invoked with luma block vector bvL as input, and chroma block vector bvC as output.
2. The prediction samples of the current coding unit are derived as follows:
   The decoding process for IBC blocks as specified in clause 8.6.3.1 is invoked with the luma coding block location (xCb, yCb), the luma coding block width cbWidth and the luma coding block height cbHeight, the luma block vector bvL, the variable cIdx set equal to 0 as inputs, and the IBC prediction samples (predSamples) that are an (cbWidth)×(cbHeight) array $predSamples_L$ of prediction luma samples as outputs.
   When treeType is equal to SINGLE_TREE, the prediction samples of the current coding unit are derived as follows:
      The decoding process for IBC blocks as specified in clause 8.6.3.1 is invoked with the luma coding block location (xCb, yCb), the luma coding block width cbWidth and the luma coding block height cbHeight, the chroma block vector bvC and the variable cIdx set equal to 1 as inputs, and the IBC prediction samples (predSamples) that are an (cbWidth/SubWidthC)×(cbHeight/SubHeightC) array $predSamples_{Cb}$ of prediction chroma samples for the chroma components Cb as outputs.
      The decoding process for IBC blocks as specified in clause 8.6.3.1 is invoked with the luma coding block location (xCb, yCb), the luma coding block width cbWidth and the luma coding block height cbHeight, the chroma block vector bvC and the variable cIdx set equal to 2 as inputs, and the IBC prediction samples (predSamples) that are an (cbWidth/SubWidthC)×(cbHeight/SubHeightC) array $predSamples_{Cr}$ of prediction chroma samples for the chroma components Cr as outputs.
3. The residual samples of the current coding unit are derived as follows:
   The decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdx set equal to 0 as inputs, and the array $resSamples_L$ as output.
   When treeType is equal to SINGLE_TREE, the decoding process for the residual signal of coding blocks coded in inter prediction mode as specified in clause 8.5.8 is invoked with the location (xTb0, yTb0) set equal to the chroma location (xCb/SubWidthC, yCb/SubHeightC), the width nTbW set equal to the chroma coding block width cbWidth/SubWidthC, the height nTbH set equal to the chroma coding block height cbHeight/SubHeightC and the variable cIdx set equal to 1 as inputs, and the array $resSamples_{Cb}$ as output.
   When treeType is equal to SINGLE_TREE, the decoding process for the residual signal of coding blocks coded in inter prediction mode as specified in clause 8.5.8 is invoked with the location (xTb0, yTb0) set equal to the chroma location (xCb/SubWidthC, yCb/SubHeightC), the width nTbW set equal to the chroma coding block width cbWidth/SubWidthC, the height nTbH set equal to the chroma coding block height cbHeight/SubHeightC and the variable cIdxset equal to 2 as inputs, and the array $resSamples_{Cr}$ as output.
4. The reconstructed samples of the current coding unit are derived as follows:
   The picture reconstruction process for a colour component as specified in clause 8.7.5 is invoked with the block location (xCurr, yCurr) set equal to (xCb, yCb), the block width nCurrSw set equal to cbWidth, the block height nCurrSh set equal to cbHeight, the variable cIdx set equal to 0, the (cbWidth)×(cbHeight) array predSamples set equal to $predSamples_L$ and the (cbWidth)×(cbHeight) array resSamples set equal to $resSamples_L$ as inputs, and the output is a modified reconstructed picture before in-loop filtering.
   When treeType is equal to SINGLE_TREE, the picture reconstruction process for a colour component as specified in clause 8.7.5 is invoked with the block location (xCurr, yCurr) set equal to (xCb/SubWidthC, yCb/SubHeightC), the block width nCurrSw set equal to cbWidth/SubWidthC, the block height nCurrSh set equal to cbHeight/SubHeightC, the variable cIdx set equal to 1, the (cbWidth/SubWidthC)×(cbHeight/SubHeightC) array predSamples set equal to $predSamples_{Cb}$ and the (cbWidth/SubWidthC)×(cbHeight/SubHeightC) array resSamples set equal to $resSamples_{Cb}$ as inputs, and the output is a modified reconstructed picture before in-loop filtering.
   When treeType is equal to SINGLE_TREE, the picture reconstruction process for a colour component as specified in clause 8.7.5 is invoked with the block location (xCurr, yCurr) set equal to (xCb/SubWidthC, yCb/SubHeightC), the block width nCurrSw set equal to cbWidth/SubWidthC, the block height nCurrSh set equal to cbHeight/SubHeightC, the variable cIdx set equal to 2, the (cbWidth/SubWidthC)×(cbHeight/SubHeightC) array predSamples set equal to $predSamples_{Cr}$ and the (cbWidth/SubWidthC)×(cbHeight/SubHeightC) array resSamples set equal to $resSamples_{Cr}$ as inputs, and the output is a modified reconstructed picture before in-loop filtering.

8.6.3 Derivation Process for Block Vector Components for IBC Blocks
8.6.3.1 General
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.
Outputs of this process are:
the luma block vector in 1/16 fractional-sample accuracy bvL.
The luma block vector mvL is derived as follows:
The derivation process for IBC luma block vector prediction as specified in clause 8.6.2.2 is invoked with the luma location (xCb, yCb), the variables cbWidth and cbHeight inputs, and the output being the luma block vector bvL.

When general_merge_flag[xCb][yCb] is equal to 0, the following applies:
1. The variable bvd is derived as follows:

$$bvd[0]=MvdL0[xCb][yCb][0] \quad (1112)$$

$$bvd[1]=MvdL0[xCb][yCb][1] \quad (1113)$$

2. The rounding process for motion vectors as specified in clause 8.5.2.14 is invoked with mvX set equal to bvL, rightShift set equal to AmvrShift, and leftShift set equal to AmvrShift as inputs and the rounded bvL as output.
3. The luma block vector bvL is modified as follows:

$$u[0]=(bvL[0]+bvd[0]+2^{18})\% \ 2^{18} \quad (1114)$$

$$bvL[0]=(u[0]>=2^{17})?(u[0]-2^{18}):u[0] \quad (1115)$$

$$u[1]=(bvL[1]+bvd[1]+2^{18})\% \ 2^{18} \quad (1116)$$

$$bvL[1]=(u[1]>=2^{17})?(u[1]-2^{18}):u[1] \quad (1117)$$

NOTE 1—The resulting values of bvL[0] and bvL[1] as specified above will always be in the range of $-2^{17}$ to $2^{17}-1$, inclusive.

When IsGt4by4 is equal to TRUE, the updating process for the history-based block vector predictor list as specified in clause 8.6.2.6 is invoked with luma block vector bvL.

It is a requirement of bitstream conformance that the luma block vector bvL shall obey the following constraints:
CtbSizeY is greater than or equal to ((yCb+(bvL[1]>>4)) & (CtbSizeY-1))+cbHeight.
IbcVirBuf[0][(x+(bvL[0]>>4)) & (IbcBufWidthY-1)][(y+(bvL[1]>>4)) & (CtbSizeY-1)] shall not be equal to -1 for x=xCb . . . xCb+cbWidth-1 and y=yCb . . . yCb+cbHeight-1.

8.6.3.2 Derivation Process for IBC Luma Block Vector Prediction

This process is only invoked when CuPredMode[0][xCb][yCb] is equal to MODE_IBC, where (xCb, yCb) specify the top-left sample of the current luma coding block relative to the top-left luma sample of the current picture.

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma block vector in 1/16 fractional-sample accuracy bvL.
The luma block vector bvL is derived by the following ordered steps:
1. When IsGt4by4 is equal to TRUE, the derivation process for spatial block vector candidates from neighbouring coding units as specified in clause 8.6.2.3 is invoked with the luma coding block location (xCb, yCb), the luma coding block width cbWidth and height cbHeight as inputs, and the outputs being the availability flags availableFlag$A_1$, availableFlag$B_1$ and the block vectors bv$A_1$ and bv$B_1$.
2. When IsGt4by4 is equal to TRUE, the block vector candidate list, bvCandList, is constructed as follows:

```
i = 0
if( availableFlagA₁ )
    bvCandList [ i++ ] = bvA₁        (1118)
```

```
if( availableFlagB₁ )
    bvCandList [ i++ ] = bvB₁
```

3. The variable numCurrCand is derived as follows:
IsGt4by4 is equal to TRUE, numCurrCand is set equal to the number of merging candidates in the bvCandList.
Otherwise (IsGt4by4 is equal to FALSE), numCurrCand is set equal to 0.
4. When numCurrCand is less than MaxNumIbcMergeCand and NumHmvpIbcCand is greater than 0, the derivation process of IBC history-based block vector candidates as specified in 8.6.2.4 is invoked with bvCandList, and numCurrCand as inputs, and modified bvCandList and numCurrCand as outputs.
5. When numCurrCand is less than MaxNumIbcMergeCand, the following applies until numCurrCand is equal to MaxNumIbcMergeCand:
bvCandList[numCurrCand][0] is set equal to 0.
bvCandList[numCurrCand][1] is set equal to 0.
numCurrCand is increased by 1.
6. The variable bvIdx is derived as follows:

$$bvIdx=general\_merge\_flag[xCb][yCb]?merge\_idx[xCb][yCb]:mvp\_10\_flag[xCb][yCb] \quad (1119)$$

7. The following assignments are made:

$$bvL[0]=bvCandList[mvIdx][0] \quad (1120)$$

$$bvL[1]=bvCandList[mvIdx][1] \quad (1121)$$

8.6.3.3 Derivation Process for IBC Spatial Block Vector Candidates

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are as follows:
the availability flags availableFlag$A_1$ and availableFlag$B_1$ of the neighbouring coding units,
the block vectors in 1/16 fractional-sample accuracy bv$A_1$, and bv$B_1$ of the neighbouring coding units,
For the derivation of availableFlag$A_1$ and mv$A_1$ the following applies:
The luma location (xNb$A_1$, yNb$A_1$) inside the neighbouring luma coding block is set equal to (xCb-1, yCb+cbHeight-1).
The derivation process for neighbouring block availability as specified in clause 6.4.4 is invoked with the current luma location (xCurr, yCurr) set equal to (xCb, yCb), the neighbouring luma location (xNb$A_1$, yNb$A_1$), checkPredModeY set equal to TRUE, and cIdx set equal to 0 as inputs, and the output is assigned to the block availability flag available$A_1$.
The variables availableFlag$A_1$ and bv$A_1$ are derived as follows:
If available$A_1$ is equal to FALSE, availableFlag$A_1$ is set equal to 0 and both components of bv$A_1$ are set equal to 0.
Otherwise, availableFlag$A_1$ is set equal to 1 and the following assignments are made:

$$bvA_1=MvL0[xNbA_1][yNbA_1] \quad (1122)$$

For the derivation of availableFlag$B_1$ and bv$B_1$ the following applies:

The luma location (xNb$B_1$, yNb$B_1$) inside the neighbouring luma coding block is set equal to (xCb+cbWidth−1, yCb−1).

The derivation process for neighbouring block availability as specified in clause 6.4.4 is invoked with the current luma location (xCurr, yCurr) set equal to (xCb, yCb), the neighbouring luma location (xNb$B_1$, yNb$B_1$), checkPredModeY set equal to TRUE, and cIdx set equal to 0 as inputs, and the output is assigned to the block availability flag available$B_1$.

The variables availableFlag$B_1$ and bv$B_1$ are derived as follows:
 If one or more of the following conditions are true, availableFlag$B_1$ is set equal to 0 and both components of bv$B_1$ are set equal to 0:
  available$B_1$ is equal to FALSE.
  available$A_1$ is equal to TRUE and the luma locations (xNb$A_1$, yNb$A_1$) and (xNb$B_1$, yNb$B_1$) have the same block vectors.
 Otherwise, availableFlag$B_1$ is set equal to 1 and the following assignments are made:

$$bvB_1 = MvL0[xNbB_1][yNbB_1] \qquad (1123)$$

8.6.3.4 Derivation Process for IBC History-Based Block Vector Candidates

Inputs to this process are:
a block vector candidate list bvCandList,
the number of available block vector candidates in the list numCurrCand.

Outputs to this process are:
the modified block vector candidate list bvCandList,
the modified number of motion vector candidates in the list numCurrCand.

The variables isPruned$A_1$ and isPruned$B_1$ are set both equal to FALSE.

For each candidate in HmvpIbcCandList[hMvpIdx] with index hMvpIdx=1 ... NumHmvpIbcCand, the following ordered steps are repeated until numCurrCand is equal to MaxNumIbcMergeCand:
 1. The variable sameMotion is derived as follows:
  If all of the following conditions are true for any block vector candidate N with N being $A_1$ or $B_1$, sameMotion and isPrunedN are both set equal to TRUE:
   IsGt4by4 is equal to TRUE.
   hMvpIdx is equal to 1.
   The candidate HmvpIbcCandList[NumHmvpIbcCand−hMvpIdx] is equal to the block vector candidate N.
   isPrunedN is equal to FALSE.
  Otherwise, sameMotion is set equal to FALSE.
 2. When sameMotion is equal to FALSE, the candidate HmvpIbcCandList[NumHmvpIbcCand−hMvpIdx] is added to the block vector candidate list as follows:

$$bvCandList[numCurrCand++] = HmvpIbcCandList[NumHmvpIbcCand-hMvpIdx] \qquad (1124)$$

8.6.3.5 Derivation Process for Chroma Block Vectors

Input to this process is:
a luma block vector in 1/16 fractional-sample accuracy bvL.
 Output of this process is a chroma block vector in 1/32 fractional-sample accuracy bvC.
 A chroma block vector is derived from the corresponding luma block vector.
 The chroma block vector bvC is derived as follows:

$$bvC[0] = ((bvL[0]>>(3+SubWidthC))*32 \qquad (1125)$$

$$bvC[1] = ((bvL[1]>>(3+SubHeightC))*32 \qquad (1126)$$

8.6.3.6 Updating Process for the History-Based Block Vector Predictor Candidate List

Inputs to this process are:
luma block vector bvL in 1/16 fractional-sample accuracy.
The candidate list HmvpIbcCandList is modified by the following ordered steps:
 1. The variable identicalCandExist is set equal to FALSE and the variable removeIdx is set equal to 0.
 2. When NumHmvpIbcCand is greater than 0, for each index hMvpIdx with hMvpIdx=0 ... NumHmvpIbcCand−1, the following steps apply until identicalCandExist is equal to TRUE:
  When bvL is equal to HmvpIbcCandList[hMvpIdx], identicalCandExist is set equal to TRUE and removeIdx is set equal to hMvpIdx.
 3. The candidate list HmvpIbcCandList is updated as follows:
  If identicalCandExist is equal to TRUE or NumHmvpIbcCand is equal to 5, the following applies:
   For each index i with i=(removeIdx+1) ... (NumHmvpIbcCand−1), HmvpIbcCandList[i−1] is set equal to HmvpIbcCandList [i].
   HmvpIbcCandList[NumHmvpIbcCand−1] is set equal to bvL.
  Otherwise (identicalCandExist is equal to FALSE and NumHmvpIbcCand is less than 5), the following applies:
   HmvpIbcCandList[NumHmvpIbcCand++] is set equal to bvL.

8.6.4 Decoding Process for IBC Blocks

8.6.4.1 General

This process is invoked when decoding a coding unit coded in IBC prediction mode.
Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
the block vector by,
a variable cIdx specifying the colour component index of the current block.
Outputs of this process are:
an array predSamples of prediction samples.
When cIdx is equal to 0, for x=xCb ... xCb+cbWidth−1 and y=yCb ... yCb+cbHeight−1, the following applies:

$$xVb = (x+(bv[0]>>4)) \& (IbcBufWidthY-1) \qquad (1127)$$

$$yVb = (y+(bv[1]>>4)) \& (CtbSizeY-1) \qquad (1128)$$

$$predSamples[x][y] = ibcVirBuf[0][xVb][yVb] \qquad (1129)$$

When cIdx is not equal to 0, for x=xCb/subWidthC ... xCb/subWidthC+cbWidth/subWidthC−1 and y=yCb/subHeightC ... yCb/subHeightC+cbHeight/subHeightC−1, the following applies:

$$xVb = (x+(bv[0]>>5)) \& (IbcBufWidthC-1) \qquad (1130)$$

$$yVb = (y+(bv[1]>>5)) \& ((CtbSizeY/subHeightC)-1) \qquad (1131)$$

$$predSamples[x][y] = ibcVirBuf[cIdx][xVb][yVb] \qquad (1132)$$

When cIdx is equal to 0, the following assignments are made for x=0 . . . cbWidth−1 and y=0 . . . cbHeight−1:

$$MvL0[xCb+x][yCb+y]=bv \quad (1133)$$

$$MvL1[xCb+x][yCb+y]=0 \quad (1134)$$

$$RefIdxL0[xCb+x][yCb+y]=-1 \quad (1135)$$

$$RefIdxL1[xCb+x][yCb+y]=-1 \quad (1136)$$

$$PredFlagL0[xCb+x][yCb+y]=0 \quad (1137)$$

$$PredFlagL1[xCb+x][yCb+y]=0 \quad (1138)$$

$$BcwIdx[xCb+x][yCb+y]=0 \quad (1139)$$

2.10. Palette Mode

In VVC, the palette mode is used for screen content coding in all of the chroma formats supported in a 4:4:4 profile (that is, 4:4:4, 4:2:0, 4:2:2 and monochrome). When palette mode is enabled, a flag is transmitted at the CU level if the CU size is smaller than or equal to 64×64 indicating whether palette mode is used. A palette coded coding unit (CU) is treated as a prediction mode other than intra prediction, inter prediction, and intra block copy (IBC) mode.

Figure 9:
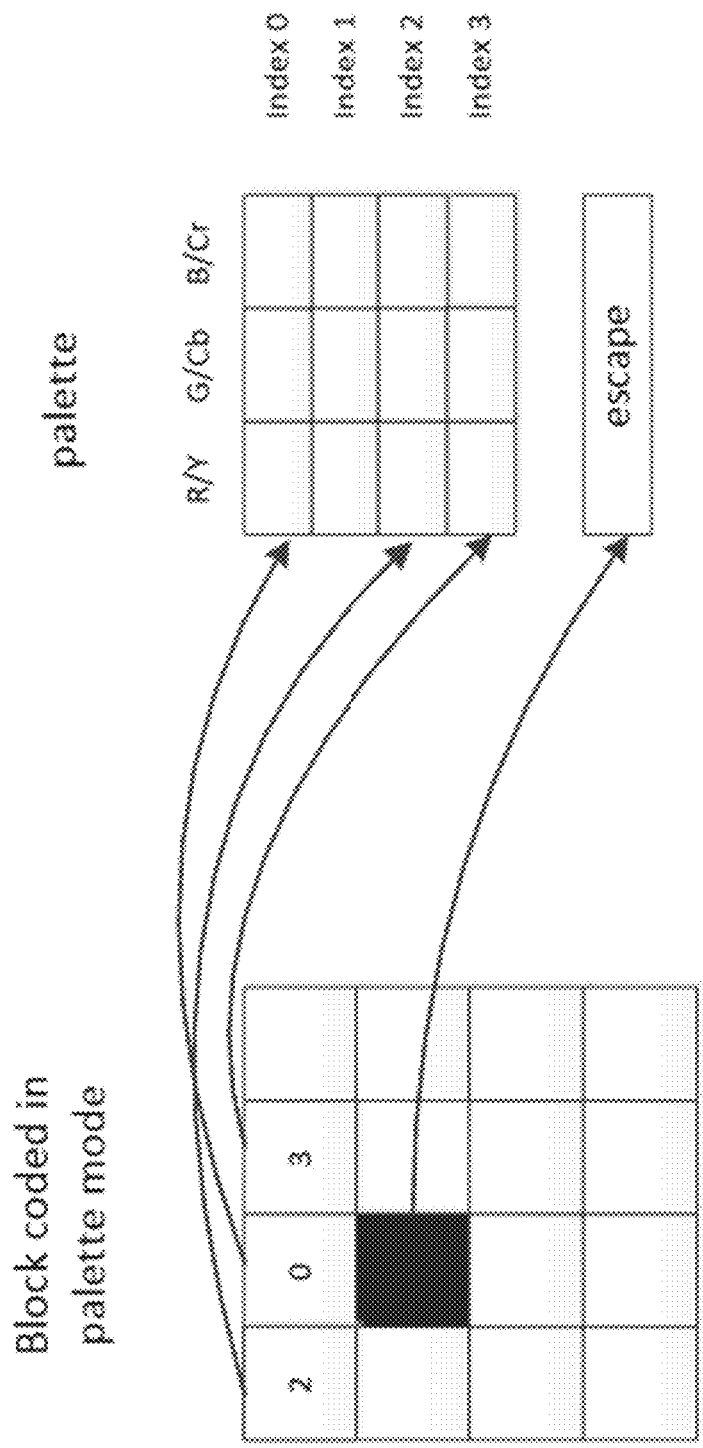
FIG. 9 shows an example of a block coded in palette mode.

If the palette mode is utilized, the sample values in the CU are represented by a set of representative colour values. The set is referred to as the palette. For positions with sample values close to the palette colours, the palette indices are signaled. It is also possible to specify a sample that is outside the palette by signaling an escape symbol. For samples within the CU that are coded using the escape symbol, their component values are signaled directly using (possibly) quantized component values. This is illustrated in FIG. 9.

For coding of the palette, a palette predictor is maintained. The predictor is initialized to 0 at the beginning of each slice for non-wavefront case and at the beginning of each CTU row for wavefront case. For each entry in the palette predictor, a reuse flag is signaled to indicate whether it is part of the current palette in the CU. The reuse flags are sent using run-length coding of zeros. After this, the number of new palette entries and the component values for the new palette entries are signaled. After encoding the palette coded CU, the palette predictor will be updated using the current palette, and entries from the previous palette predictor that are not reused in the current palette will be added at the end of the new palette predictor until the maximum size allowed is reached. An escape flag is signaled for each CU to indicate if escape symbols are present in the current CU. If escape symbols are present, the palette table is augmented by one and the last index is assigned to be the escape symbol.

Figure 10:
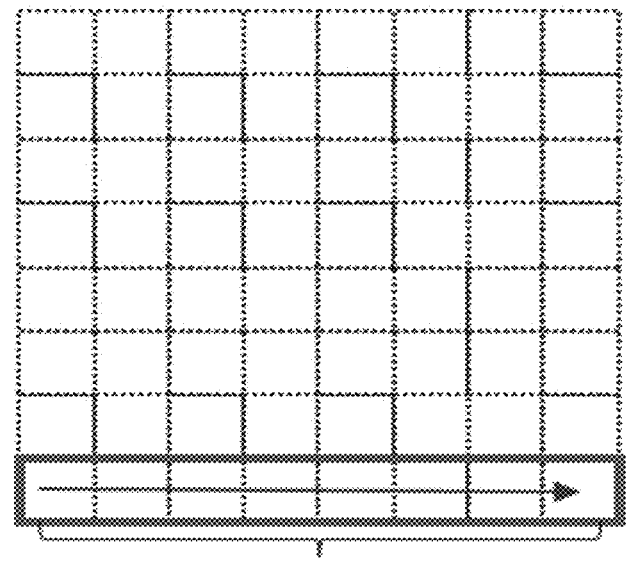
FIG. 10 shows an example of a Sub-block-based index map scanning for palette, left for horizontal scanning and right for vertical scanning.
Figure 10:
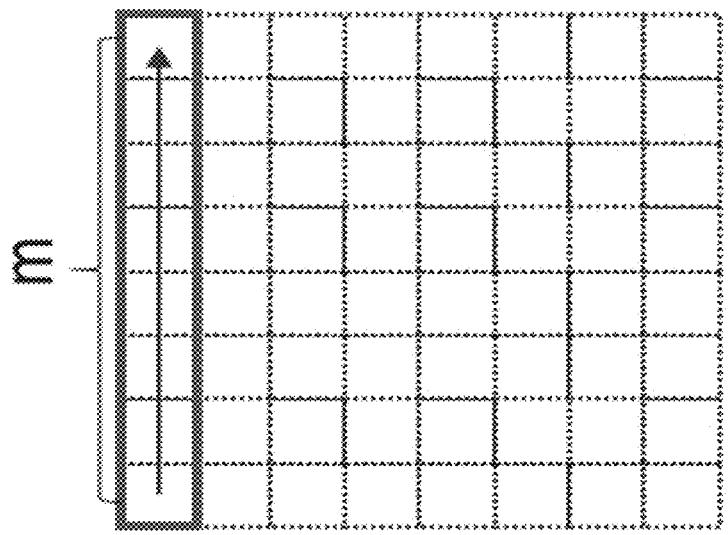

In a similar way as the coefficient group (CG) used in transform coefficient coding, a CU coded with palette mode is divided into multiple line-based coefficient group, each consisting of m samples (i.e., m=16), where index runs, palette index values, and quantized colors for escape mode are encoded/parsed sequentially for each CG. Same as in HEVC, horizontal or vertical traverse scan can be applied to scan the samples, as shown in FIG. 10.

The encoding order for palette run coding in each segment is as follows: For each sample position, 1 context coded bin run_copy_flag=0 is signaled to indicate if the pixel is of the same mode as the previous sample position, i.e., if the previously scanned sample and the current sample are both of run type COPY_ABOVE or if the previously scanned sample and the current sample are both of run type INDEX and the same index value. Otherwise, run_copy_flag=1 is signaled. If the current sample and the previous sample are of different modes, one context coded bin copy_above_palette_indices_flag is signaled to indicate the run type, i.e., INDEX or COPY_ABOVE, of the current sample. Here, decoder doesn't have to parse run type if the sample is in the first row (horizontal traverse scan) or in the first column (vertical traverse scan) since the INDEX mode is used by default. With the same way, decoder doesn't have to parse run type if the previously parsed run type is COPY_ABOVE. After palette run coding of samples in one coding pass, the index values (for INDEX mode) and quantized escape colors are grouped and coded in another coding pass using context-adaptive binary arithmetic coding (CABAC) bypass coding. Such separation of context coded bins and bypass coded bins can improve the throughput within each line CG.

For slices with dual luma/chroma tree, palette is applied on luma (Y component) and chroma (Cb and Cr components) separately, with the luma palette entries containing only Y values and the chroma palette entries containing both Cb and Cr values. For slices of single tree, palette will be applied on Y, Cb, Cr components jointly, i.e., each entry in the palette contains Y, Cb, Cr values, unless when a CU is coded using local dual tree, in which case coding of luma and chroma is handled separately. In this case, if the corresponding luma or chroma blocks are coded using palette mode, their palette is applied in a way similar to the dual tree case (this is related to non-4:4:4 coding).

For slices coded with dual tree, the maximum palette predictor size is 63, and the maximum palette table size for coding of the current CU is 31. For slices coded with dual tree, the maximum predictor and palette table sizes are halved, i.e., maximum predictor size is 31 and maximum table size is 15, for each of the luma palette and the chroma palette. For deblocking, the palette coded block on the sides of a block boundary is not deblocked.

2.10.1 Palette Mode for Non-4:4:4 Content

Palette mode in VVC is supported for all chroma formats in a similar manner as the palette mode in HEVC SCC. For non-4:4:4 content, the following customization is applied:

1. When signaling the escape values for a given sample position, if that sample position has only the luma component but not the chroma component due to chroma subsampling, then only the luma escape value is signaled. This is the same as in HEVC SCC.
2. For a local dual tree block, the palette mode is applied to the block in the same way as the palette mode applied to a single tee block with two exceptions:
   a. The process of palette predictor update is slightly modified as follows. Since the local dual tree block only contains luma (or chroma) component, the predictor update process uses the signaled value of luma (or chroma) component and fills the "missing" chroma (or luma) component by setting it to a default value of (1<<(component bit depth−1)).
   b. The maximum palette predictor size is kept at 63 (since the slice is coded using single tree) but the maximum palette table size for the luma/chroma block is kept at 15 (since the block is coded using separate palette).

For palette mode in monochrome format, the number of colour components in a palette coded block is set to 1 instead of 3.

2.11. Current Text on Palette Coding Mode in JVET-Q2001-vE

2.11.1 Syntax on Palette Coding Mode

| | Descriptor |
|---|---|
| palette_coding( x0, y0, cbWidth, cbHeight, treeType ) { | |
|   startComp = ( treeType = = DUAL_TREE_CHROMA ) ? 1 : 0 | |
|   numComps = ( treeType = = SINGLE_TREE) ? ( ChromaArrayType = = 0 ? 1 : 3 ) : ( treeType = = DUAL_TREE_CHROMA ) ? 2 : 1 | |
|   maxNumPaletteEntries = ( treeType = = SINGLE_TREE ) ? 31 : 15 | |
|   palettePredictionFinished = 0 | |
|   NumPredictedPaletteEntries = 0 | |
|   for( predictorEntryIdx = 0; predictorEntryIdx < PredictorPaletteSize[ startComp ] && | |
|     ! palettePredictionFinished && | |
|     NumPredictedPaletteEntries < maxNumPaletteEntries; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < maxNumPaletteEntries ) | |
|     num_signalled_palette_entries | ae(v) |
|   for( cIdx = startComp; cIdx < ( startComp + numComps ); cIdx++ ) | |
|     for( i = 0; i < num_signalled_palette_entries; i++ ) | |
|       new_palette_entries[ cIdx ][ i ] | ae(v) |
|   if( CurrentPaletteSize[ startComp ] > 0 ) | |
|     palette_escape_val_present_flag | ae(v) |
|   if( MaxPaletteIndex > 0 ) { | |
|     adjust = 0 | |
|     palette_transpose_flag | ae(v) |
|   } | |
|   if( treeType != DUAL_TREE_CHROMA && palette_escape_val_present_flag ) | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   if( treeType != DUAL_TREE_LUMA && palette_escape_val_present_flag ) | |
|     if( cu_chroma_qp_offset_enabled_flag && !IsCuChromaQpOffsctCoded ) { | |
|       cu_chroma_qp_offset_flag | ae(v) |
|       if( cu_chroma_qp_offset_flag && chroma_qp_offset_list_len_minus1 > 0 ) | |
|         cu_chroma_qp_offset_idx | ae(v) |
|     } | |
|   PreviousRunPosition = 0 | |
|   PreviousRunType = 0 | |
|   for( subSetId = 0; subSetId <= ( cbWidth * cbHeight − 1) / 16; subSetId++ ) { | |
|     minSubPos = subSetId * 16 | |
|     if( minSubPos + 16 > cbWidth * cbHeight) | |
|       maxSubPos = cbWidth * cbHeight | |
|     else | |
|       maxSubPos = minSubPos + 16 | |
|     RunCopyMap[ x0 ][ y0 ] = 0 | |
|     PaletteScanPos = minSubPos | |
|     log2CbWidth = Log2( cbWidth ) | |
|     log2CbHeight = Log2( cbHeight ) | |
|     while( PaletteScanPos < maxSubPos ) { | |
|       xC = x0 + TraverseScanOrder[ log2CbWidth ][ log2CbHeight ][ PaletteScanPos ][ 0 ] | |
|       yC = y0 + TraverseScanOrder[ log2CbWidth ][ log2CbHeight ][ PaletteScanPos ][ 1 ] | |
|       if( PaletteScanPos > 0 ) { | |
|         xcPrev = x0 + TraverseScanOrder[ log2CbWidth ][ log2CbHeight ][ PaletteScanPos − 1 ][ 0 ] | |
|         ycPrev = y0 + TraverseScanOrder[ log2CbWidth ][ log2CbHeight ][ PaletteScanPos − 1 ][ 1 ] | |
|       if( MaxPaletteIndex > 0 && PaletteScanPos > 0 ) { | |
|         run_copy_flag | ae(v) |
|         RunCopyMap[ xC ][ yC ] = run_copy_flag | |
|       } | |
|       CopyAboveIndicesFlag[ xC ][ yC ] = 0 | |
|       if( MaxPaletteIndex > 0 && !RunCopyMap[ xC ][ yC ] ) { | |
|         if( ( ( !palette_transpose_flag && yC > 0 ) || ( | |

| | Descriptor |
|---|---|
| palette_transpose_flag && xC > 0 ) )<br>    && CopyAboveIndicesFlag[ xcPrev ][ ycPrev ] = = 0 )<br>{<br>    copy_above_palette_indices_flag<br>    CopyAboveIndicesFlag[ xC ][ yC ] =<br>copy_above_palette_indices_flag<br>    }<br>    PreviousRunType = CopyAboveIndicesFlag[ xC ][ yC ]<br>    PreviousRunPosition = PaletteScanPos<br>  } else<br>    CopyAboveIndicesFlag[ xC ][ yC ] =<br>CopyAboveIndicesFlag[ xcPrev ][ ycPrev ]<br>  PaletteScanPos ++<br>}<br>PaletteScanPos = minSubPos<br>while( PaletteScanPos < maxSubPos ) {<br>  xC = x0 + TraverseScanOrder[ log2CbWidth ][ log2CbHeight ][ PaletteScanPos ][ 0 ]<br>  yC = y0 + TraverseScanOrder[ log2CbWidth ][ log2CbHeight ][ PaletteScanPos ][ 1 ]<br>  if( PaletteScanPos > 0 ) {<br>    xcPrev =x0 + TraverseScanOrder[ log2CbWidth ][ log2CbHeight ][ PaletteScanPos − 1 ][ 0 ]<br>    ycPrev = y0 + TraverseScanOrder[ log2CbWidth ][ log2CbHeight ][ PaletteScanPos − 1 ][ 1 ]<br>  }<br>  if( MaxPaletteIndex > 0 && !RunCopyMap[ xC ][yC ] &&<br>    CopyAboveIndicesFlag[ xC ][ yC ] = = 0 ) {<br>    if( MaxPaletteIndex − adjust > 0 )<br>      palette_idx_idc<br>    adjust = 1<br>  }<br>  if( !RunCopyMap[ xC ][ yC ] && CopyAboveIndicesFlag[ xC ][ yC ]<br>= = 0 )<br>    CurrPaletteIndex = palette_idx_idc<br>  if( CopyAboveIndicesFlag[ xC ][ yC ] = = 0 )<br>    PaletteIndexMap[ xC ][ yC ] = CurrPaletteIndex<br>  else if( !palette_transpose_flag)<br>    PaletteIndexMap[ xC ][ yC ] = PaletteIndexMap[ xC ][ yC − 1 ]<br>  else<br>    PaletteIndexMap[ xC ][ yC ] = PaletteIndexMap[ xC − 1 ][ yC ]<br>  PaletteScanPos ++<br>}<br>if( palette_escape_val_present_flag )<br>  for( cIdx = startComp; cIdx < ( startComp + numComps ); cIdx++ )<br>    for( sPos = minSubPos; sPos < maxSubPos; sPos++ ) {<br>      xC = x0 + TraverseScanOrder[ log2CbWidth ][ log2CbHeight ][ sPos ][ 0 ]<br>      yC = y0 + TraverseScanOrder[ log2CbWidth ][ log2CbHeight ][ sPos ][ 1 ]<br>      if( !( treeType = = SINGLE_TREE && cIdx != 0 &&<br>        xC % SubWidthC != 0 && yC % SubHeightC != 0 ) ) {<br>        if( PaletteIndexMap[ cIdx ][ xC ][ yC ] = = MaxPaletteIndex ) {<br>          palette_escape_val<br>          PaletteEscapeVal[ cIdx ][ xC ][ yC ] = palette_escape_val<br>        }<br>      }<br>    }<br>}<br>} | <br><br><br>ae(v)<br><br><br><br><br><br><br><br><br><br><br><br><br><br><br><br><br><br><br><br><br>ae(v)<br><br><br><br><br><br><br><br><br><br><br><br><br><br><br><br><br><br><br>ae(v) |

2.11.2 Palette Coding Mode Semantics

In the following semantics, the array indices x0, y0 specify the location (x0, y0) of the top-left luma sample of the considered coding block relative to the top-left luma sample of the picture. The array indices xC, yC specify the location (xC, yC) of the sample relative to the top-left luma sample of the picture, when treeType is equal to SINGLE_TREE or DUAL_TREE_LUMA; and relative to the top-left chroma sample of the picture, when treeType is equal to DUAL_TREE_CHROMA. The array index startComp specifies the first colour component of the current palette table. startComp equal to 0 indicates the Y component; startComp equal to 1 indicates the Cb component; startComp equal to 2 indicates the Cr component. numComps specifies the number of colour components in the current palette table.

The predictor palette consists of palette entries from previous coding units that are used to predict the entries in the current palette.

PredictorPaletteSize[startComp] specifies the size of the predictor palette for the first colour component of the current palette table startComp. PredictorPaletteSize[startComp] is derived as specified in clause 8.4.5.3.

PalettePredictorEntryReuseFlags[i] equal to 1 specifies that the i-th entry in the predictor palette is reused in the current palette. PalettePredictorEntryReuseFlags[i] equal to 0 specifies that the i-th entry in the predictor palette is not an entry in the current palette. All elements of the array PalettePredictorEntryReuseFlags[i] are initialized to 0.

palette_predictor_run is used to determine the number of zeros that precede a non-zero entry in the array PalettePredictorEntryReuseFlags.

It is a requirement of bitstream conformance that the value of palette_predictor_run shall be in the range of 0 to (PredictorPaletteSize[startComp]−predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to maxNumPaletteEntries, inclusive.

num_signaled_palette_entries specifies the number of entries in the current palette that are explicitly signaled for the first colour component of the current palette table startComp.

When num_signaled_palette_entries is not present, it is inferred to be equal to 0.

The variable CurrentPaletteSize[startComp] specifies the size of the current palette for the first colour component of the current palette table startComp and is derived as follows:

CurrentPaletteSize[startComp]=NumPredictedPaletteEntries+num_signaled_palette_entries (180)

The value of CurrentPaletteSize[startComp] shall be in the range of 0 to maxNumPaletteEntries, inclusive.

new_palette_entries[cIdx][i] specifies the value for the i-th signaled palette entry for the colour component cIdx.

The variable PredictorPaletteEntries[cIdx][i] specifies the i-th element in the predictor palette for the colour component cIdx.

The variable CurrentPaletteEntries[cIdx][i] specifies the i-th element in the current palette for the colour component cIdx and is derived as follows:

```
numPredictedPaletteEntries = 0
for( i = 0; i < PredictorPaletteSize[ startComp ]; i++ )
  if( PalettePredictorEntryReuseFlags[ i ] ) {
    for( cIdx =startComp; cIdx < ( startComp + numComps); cIdx++ )
      CurrentPaletteEntries[ cIdx ][ numPredictedPaletteEntries ] =
PredictorPaletteEntries[ cIdx ][ i ]
    numPredictedPaletteEntries++
  }
for( cIdx = startComp; cIdx < (startComp + numComps); cIdx++)           (181)
  for( i = 0; i < num_signalled_palette_entries[startComp]; i++)
    CurrentPaletteEntries[ cIdx ][ numPredictedPaletteEntries + i ] = new_palette_entries[ cIdx ][ i ]
``` palette_escape_val_present_flag equal to 1 specifies that the current coding unit contains at least one escape coded sample. palette_escape_val_present_flag equal to 0 specifies that there are no escape coded samples in the current coding unit. When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize[startComp]−1+palette_escape_val_present_flag.

palette_idx_idc is an indication of an index to the palette table, CurrentPaletteEntries. The value of palette_idx_idc shall be in the range of 0 to MaxPaletteIndex, inclusive, for the first index in the block and in the range of 0 to (MaxPaletteIndex−1), inclusive, for the remaining indices in the block.

When palette_idx_idc is not present, it is inferred to be equal to 0.

palette_transpose_flag equal to 1 specifies that vertical traverse scan is applied for scanning the indices for samples in the current coding unit. palette_transpose_flag equal to 0 specifies that horizontal traverse scan is applied for scanning the indices for samples in the current coding unit. When not present, the value of palette_transpose_flag is inferred to be equal to 0.

The array TraverseScanOrder specifies the scan order array for palette coding. TraverseScanOrder is assigned the horizontal scan order HorTravScanOrder if palette_transpose_flag is equal to 0 and TraverseScanOrder is assigned the vertical scan order VerTravScanOrder if if palette_transpose_flag is equal to 1.

run_copy_flag equal to 1 specifies that the palette run type is the same as the run type at the previously scanned position and palette run index is the same as the index at the previous scanned position if copy_above_palette_indices_flag is equal to 0. Otherwise, run_copy_flag equal to 0 specifies that the palette run type is different from the run type at the previously scanned position.

copy_above_palette_indices_flag equal to 1 specifies that the palette index is equal to the palette index at the same location in the row above if horizontal traverse scan is used or the same location in the left column if vertical traverse scan is used. copy_above_palette_indices_flag equal to 0 specifies that an indication of the palette index of the sample is coded in the bitstream or inferred.

The variable CopyAboveIndicesFlag[xC][yC] equal to 1 specifies that the palette index is copied from the palette index in the row above (horizontal scan) or left column (vertical scan). CopyAboveIndicesFlag[xC][yC] equal to 0 specifies that the palette index is explicitly coded in the bitstream or inferred.

The variable PaletteIndexMap[xC][yC] specifies a palette index, which is an index to the array represented by CurrentPaletteEntries. The value of PaletteIndexMap[xC][yC] shall be in the range of 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
   xcPrev = x0 + TraverseScanOrder[ log2CbWidth ][ log2bHeight ][ PaletteScanPos − 1 ][ 0 ]
   ycPrev = y0 + TraverseScanOrder[ log2CbWidth ][ log2bHeight ][ PaletteScanPos − 1 ][ 1 ]
   if( CopyAboveIndicesFlag[ xcPrev ][ ycPrev ] = = 0 ) {
      adjustedRefPaletteIndex = PaletteIndexMap[ xcPrev ][ ycPrev ] {    (182)
   }
   else {
      if( !palette_transpose_flag )
         adjustedRefPaletteIndex = PaletteIndexMap[ xC ][ yC − 1 ]
      else
         adjustedRefPaletteIndex = PaletteIndexMap[ xC − 1 ][ yC ]
   }
}
```

When CopyAboveIndicesFlag[xC][yC] is equal to 0, the variable CurrPaletteIndex is derived as follows:

if(CurrPaletteIndex>=adjustedRefPaletteIndex)CurrPaletteIndex++ (183)

palette_escape_val specifies the quantized escape coded sample value for a component.

The variable PaletteEscapeVal[cIdx][xC][yC] specifies the escape value of a sample for which PaletteIndexMap[xC][yC] is equal to MaxPaletteIndex and palette_escape_val_present_flag is equal to 1. The array index cIdx specifies the colour component.

It is a requirement of bitstream conformance that PaletteEscapeVal[cIdx][xC][yC] shall be in the range of 0 to $(1<<(BitDepth+1))-1$, inclusive, for cIdx equal to 0, and in the range of 0 to $(1<<(BitDepth+1))-1$, inclusive, for cIdx not equal to 0.

2.11.3 Decoding Process for Palette Mode

Inputs to this process are:
a location (xCbComp, yCbComp) specifying the top-left sample of the current coding block relative to the top-left sample of the current picture,
a variable treeType specifying whether a single or a dual tree is used and if a dual tree is used, it specifies whether the current tree corresponds to the luma or chroma components,
a variable cIdx specifying the colour component of the current block,
two variables nCbW and nCbH specifying the width and height of the current coding block, respectively.

Output of this process is an array recSamples[x][y], with x=0 . . . nCbW−1, y=0 . . . nCbH−1 specifying reconstructed sample values for the block.

Depending on the value of treeType, the variables startComp, numComps and maxNumPalettePredictorSize are derived as follows:

If treeType is equal to SINGLE_TREE:

startComp=0 (430)

numComps=ChromaArrayType==0?1:3 (431)

maxNumPalettePredictorSize=63 (432)

Otherwise, treeType is equal to DUAL_TREE_LUMA:

startComp=0 (433)

numComps=1 (434)

maxNumPalettePredictorSize=31 (435)

Otherwise, treeType is equal to DUAL_TREE_CHROMA:

startComp=1 (436)

numComps=2 (437)

maxNumPalettePredictorSize=31 (438)

Depending on the value of cIdx, the variables nSubWidth and nSubHeight are derived as follows:
If cIdx is greater than 0 and startComp is equal to 0, nSubWidth is set to SubWidthC and nSubHeight is set to SubHeightC.
Otherwise, nSubWidth is set to 1 and nSubHeight is set to 1.

The (nCbW×nCbH) block of the reconstructed sample array recSamples at location (xCbComp, yCbComp) is represented by recSamples[x][y] with x=0 . . . nCTbW−1 and y=0 . . . nCbH−1, and the value of recSamples[x][y] for each x in the range of 0 to nCbW−1, inclusive, and each y in the range of 0 to nCbH−1, inclusive, is derived as follows:
The variables xL, yL, xCbL, and yCbL are derived as follows:

$xL = x * nSubWidth$ (439)

$yL = y * nSubHeight$ (440)

$xCbL = xCbComp * nSubWidth$ (441)

$yCbL = yCbComp * nSubHeight$ (442)

The variable bIsEscapeSample is derived as follows:
If PaletteIndexMap[xCbL+xL][yCbL+yL] is equal to MaxPaletteIndex and palette_escape_val_present_flag is equal to 1, bIsEscapeSample is set equal to 1.
Otherwise, bIsEscapeSample is set equal to 0.
If bIsEscapeSample is equal to 0, the following applies:

recSamples[x][y]=CurrentPaletteEntries[cIdx][PaletteIndexMap[xCbL+xL][yCbL+yL]] (443)

Otherwise (bIsEscapeSample is equal to 1), the following ordered steps apply:
1. The quantization parameter qP is derived as follows:
If cIdx is equal to 0, qP=Max(QpPrimeTsMin, Qp'Y) (444)

Otherwise, if cIdx is equal to 1, qP=Max(QpPrimeTsMin, Qp'Cb) (445)

Otherwise (cIdx is equal to 2), qP=Max(QpPrimeTsMin, Qp'Cr) (446)

2. The list levelScale[ ] is specified as levelScale[k]={40, 45, 51, 57, 64, 72} with k=0 . . . 5.
3. The following applies:

$$tmpVal=(PaletteEscapeVal[cIdx][xCbL+xL][yCbL+yL]*levelScale[qP\%6])<<(qP/6)+32)>>6 \quad (447)$$

$$recSamples[x][y]=Clip3(0, (1<<BitDepth)-1, tmpVal) \quad (448)$$

The variable localDualTree is derived as follows:

$$localDualTree=treeType!=SINGLE\_TREE\&\& \\ (slice\_type!=I||(slice\_type==I\&\&qtbtt\_dual\_ \\ tree\_intra\_flag==0))?1:0 \quad (449)$$

When localDualTree is equal to 1, the following applies:
If treeType is equal to DUAL_TREE_LUMA, the following applies for i=0 . . . num_signaled_palette_entries[start-Comp]−1:

$$CurrentPaletteEntries[1][NumPredictedPaletteEntries+i]=1<<(BitDepth-1) \quad (450)$$

$$CurrentPaletteEntries[2][NumPredictedPaletteEntries+i]=1<<(BitDepth-1) \quad (451)$$

Otherwise (if treeType is equal to DUAL_TREE_CHROMA), the following applies for i=0 . . . num_signaled_palette_entries[startComp]−1:

$$CurrentPaletteEntries[0][NumPredictedPaletteEntries+i]=1<<(BitDepth-1) \quad (452)$$

The variables CurrentPaletteSize[0], startComp, numComps and maxNumPalettePredictorSize are derived as follows:

$$CurrentPaletteSize[0]=CurrentPaletteSize[startComp] \quad (453)$$

$$startComp=0 \quad (454)$$

$$numComps=3 \quad (455)$$

$$maxNumPalettePredictorSize=63 \quad (456)$$

When one of the following conditions is true:
cIdx is equal to 0 and numComps is equal to 1;
cIdx is equal to 2;
the value PredictorPaletteSize[startComp] and the array PredictorPaletteEntries are derived or modified as follows:

```
for( i = 0; i < CurrentPaletteSize[ startComp ]; i++ )
  for( cIdx = startComp; cIdx < (startComp + numComps); cIdx++ )
    newPredictorPaletteEntries[ cIdx ][ i ] = CurrentPaletteEntries[ cIdx ][ i ]
newPredictorPaletteSize = CurrentPaletteSize[ startComp ]
for( i = 0; i < PredictorPaletteSize[ startComp ] && newPredictorPaletteSize < maxNumPalettePredictorSize;
i++ )
  if( !PalettePredictorEntryReuseFlags[ i ] ) {
    for( cIdx = startComp; cIdx < (startComp + numComps); cIdx++ )   (457)
      newPredictorPaletteEntries[ cIdx ][ newPredictorPaletteSize ] =
        PredictorPaletteEntries[ cIdx ][ i ]
    newPredictorPaletteSize++
  }
for( cIdx = startComp; cIdx < ( startComp + numComps ); cIdx++ )
  for( i = 0; i < newPredictorPaletteSize; i++ )
    PredictorPaletteEntries[ cIdx ][ i ] = newPredictorPaletteEntries[ cIdx ][ i ]
PredictorPaletteSize[ startComp ] = newPredictorPaletteSize
```

When qtbtt_dual_tree_intra_flag is equal to 0 or slice_type is not equal to I, the following applies:

$$PredictorPaletteSize[1]=newPredictorPaletteSize \quad (458)$$

It is a requirement of bitstream conformance that the value of PredictorPaletteSize[startComp] shall be in the range of 0 to maxNumPalettePredictorSize, inclusive.

3. Examples of Problems Solved by Various Embodiments

In the current design of IBC virtual buffer, some problems exist.
1) Only one VPDU in the IBC virtual buffer is reset when current CU is larger than one VPDU, i.e., the current CU includes multiple VPDUs.
2) Palette mode may be further improved.

4. A Listing of Embodiments and Techniques

Denote the width and height of a VPDU by vSize, e.g., VSize=min(64, ctbSizeY), where ctbSizeY is the luma CTB/CTU width/height.
IBC Buffer Related
1. When a block (CU/CB) size is larger than VPDU size, all corresponding VPDUs in the IBC buffer may be reset.
   a. In one example, the corresponding VPDUs are defined as VPDUs overlapped with the CU mapped to the IBC buffer.
   b. In one example, all corresponding VPDUs are reset to −1.
   c. In one example, the width of a region within the IBC buffer is derived as max (VSize, block width) instead of VSize wherein the region is the area that needs to be reset.
   d. In one example, the height of a region within the IBC buffer is derived as max (VSize, block height) instead of VSize wherein the region is the area that needs to be reset.
Palette Mode Related
2. Palette predictor values in the predictor palette may be updated before coding a new block
   a. In one example, the palette predictor value may be updated using the information coded in the previous palette-coded block.
   b. In one example, the palette predictor value may be updated using a palette predictor that was previously used with the same entry.
   c. In one example, the difference between the palette predictor and its updated value may be indicated in the bitstream.

5. Embodiment Examples

5.1. Embodiment #1

The changes, marked in boldface underline are based on JVET-Q2001-vD.
7.4.11.5 Coding Unit Semantics
When ResetIbcBuf is equal to 1, the following applies:
For x=0 . . . IbcBufWidthY−1 and y=0 . . . CtbSizeY−1, the following assignments are made:

$$IbcVirBuf[0][x][y]=-1 \qquad (178)$$

The variable ResetIbcBuf is set equal to 0.
When x0% VSize is equal to 0 and y0% VSize is equal to 0, the following assignments are made for x=x0 . . . x0+Max(VSize, cbWidth)−1 and y=y0 . . . y0+Max(VSize, cbHeight)−1:

$$IbcVirBuf[0][(x+(IbcBufWidthY{>}{>}1))\%\ IbcBufWidthY][y\ \%\ CtbSizeY]=-1 \qquad (179)$$

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
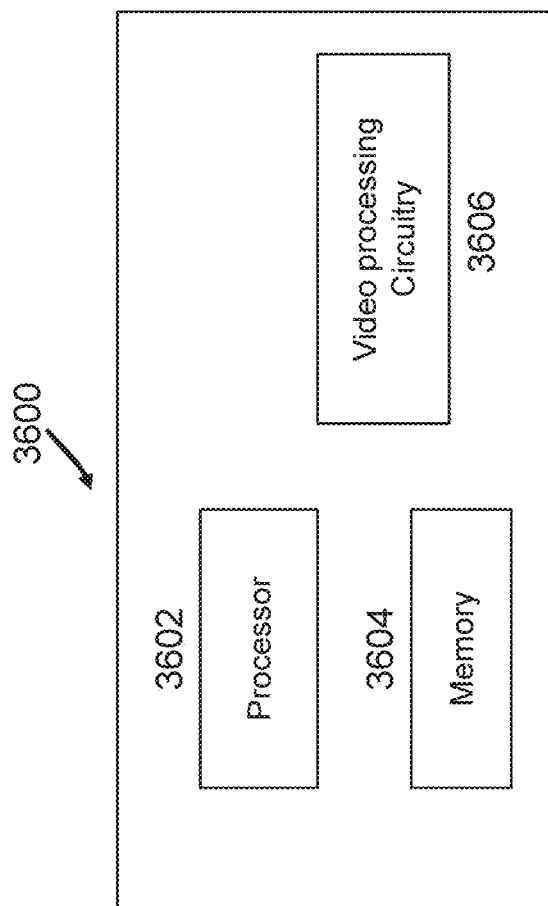
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
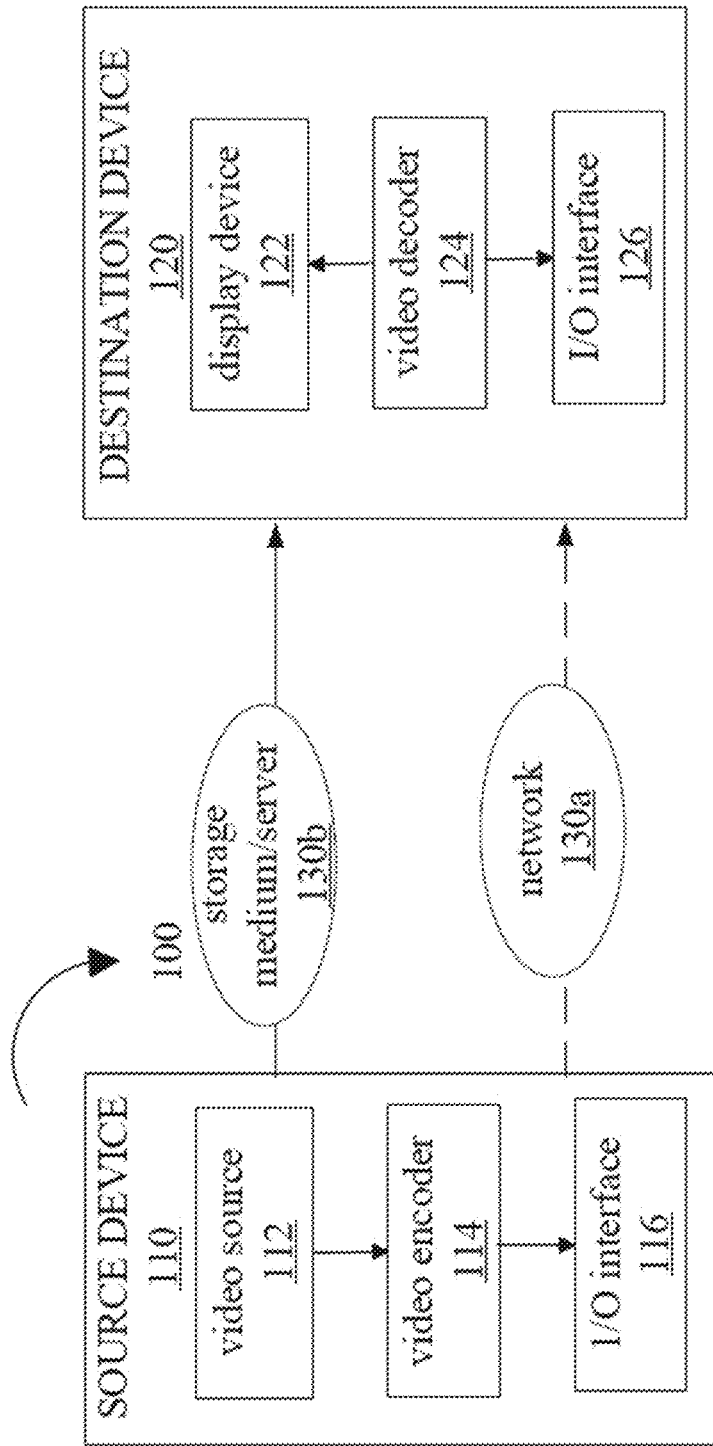
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
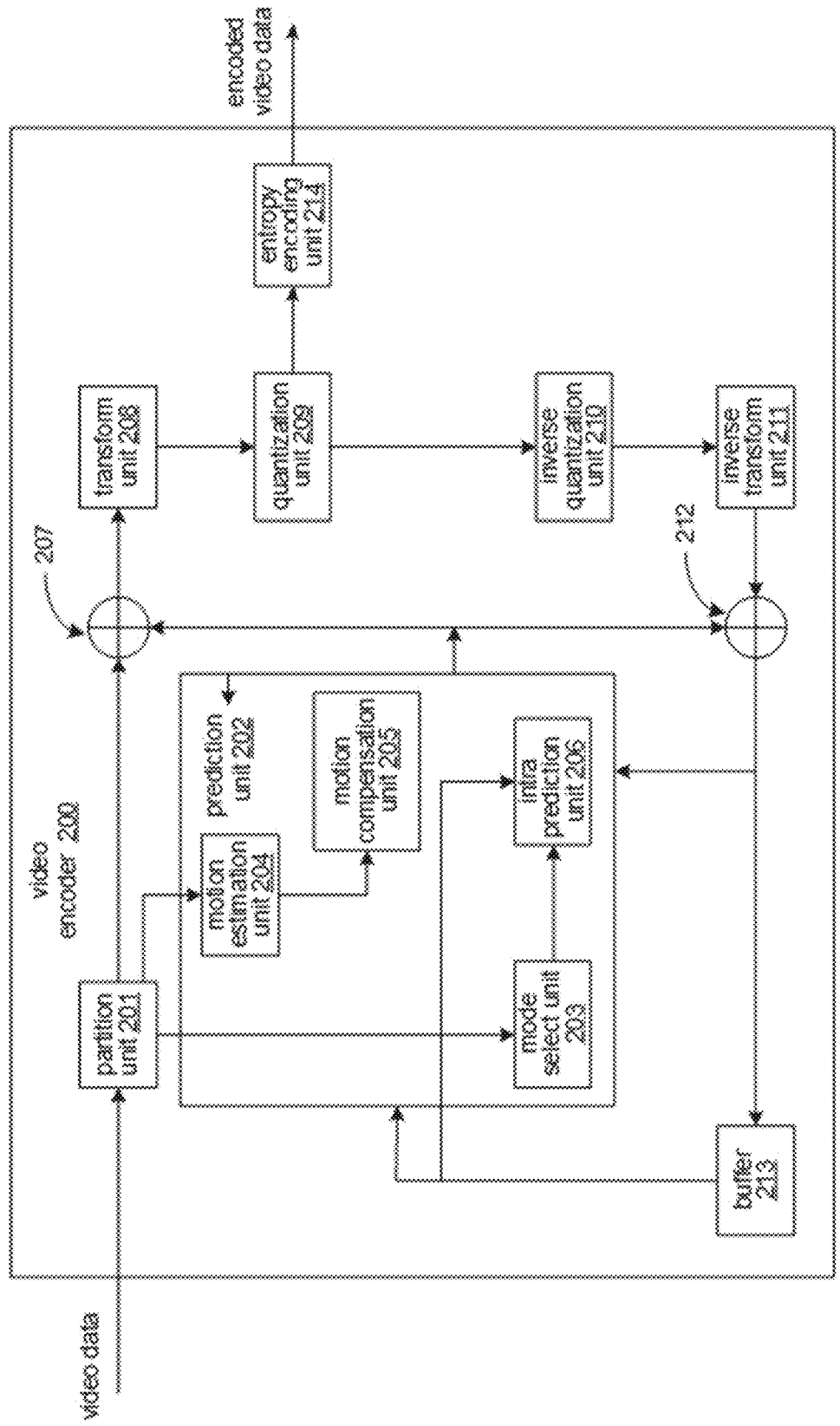
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
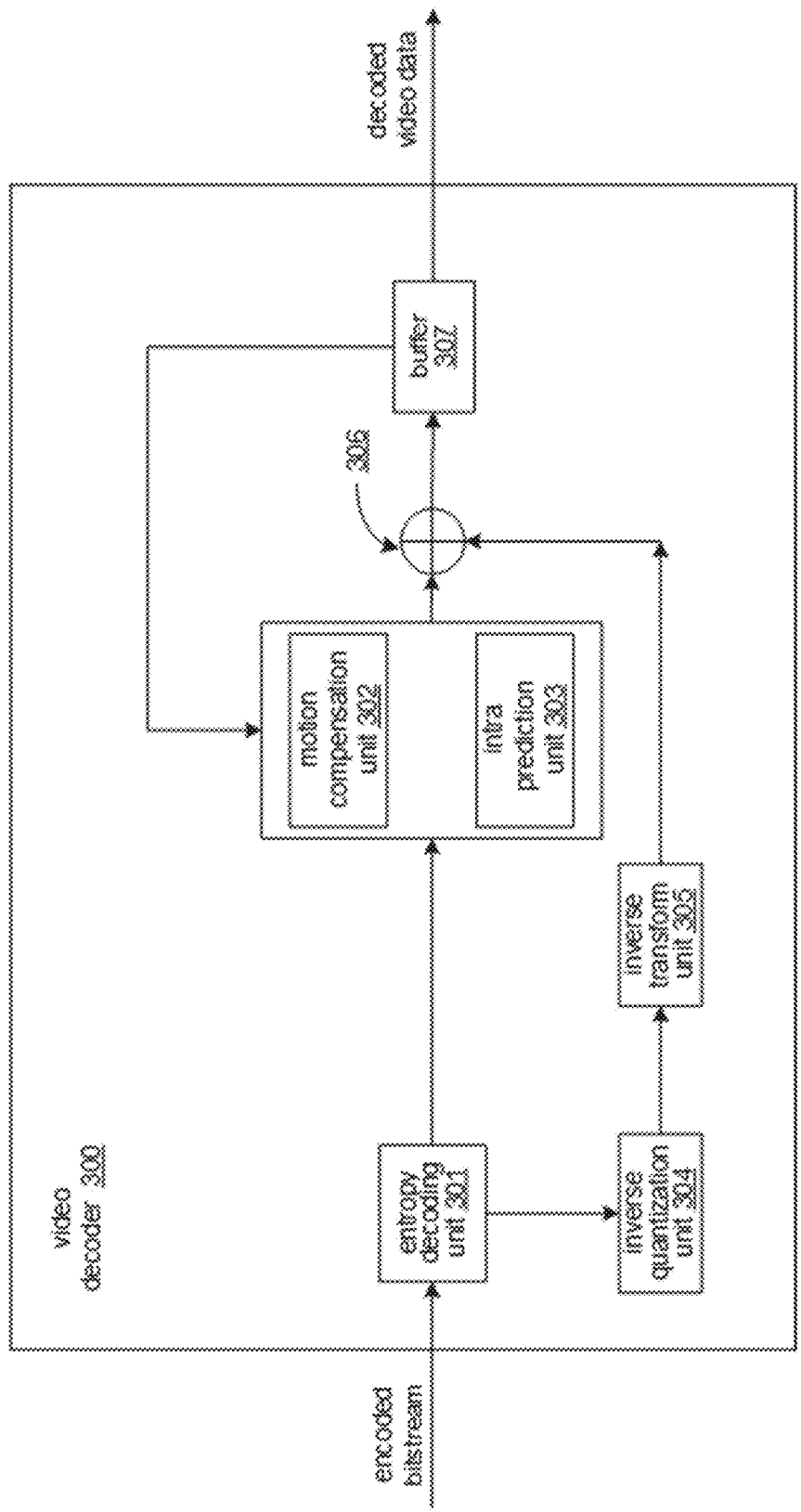
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of a first set of solutions preferred by some embodiments is provided next.

The following solutions show example embodiments of techniques discussed in the previous section (e.g., item 1).

Figure 3:
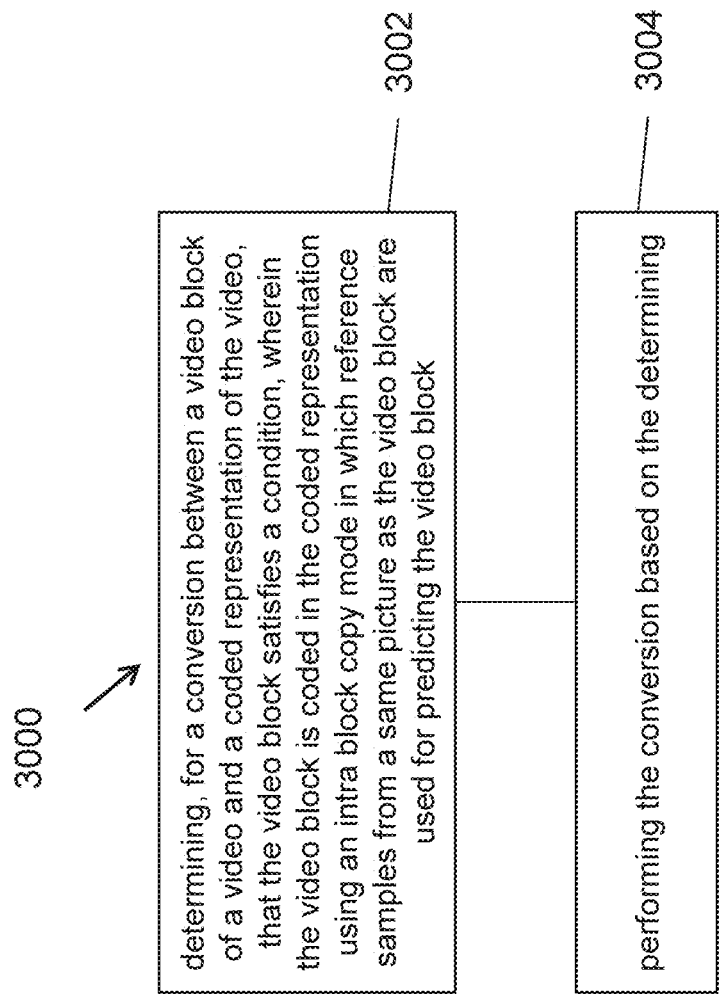
FIG. 3 is a flowchart for an example method of video processing.

1. A video processing method (e.g., method 3000 in FIG. 3), comprising: determining (3002), for a conversion between a video block of a video and a coded representation of the video, that the video block satisfies a condition, wherein the video block is coded in the coded representation using an intra block copy mode in which reference samples from a same picture as the video block are used for predicting the video block; and performing (3004) the conversion based on the determining; wherein, due to the video block satisfying the condition, a portion of an intra block copy buffer is reset during the conversion.

2. The method of solution 1, wherein the portion comprises all corresponding virtual pipeline data units (VPDUs) in the intra block copy buffer.

3. The method of solution 2, wherein the corresponding VPDUs overlap with the video block in the intra block copy buffer.

4. The method of any of solutions 2-3, wherein the VPDUs are resetted to a value equal to −1.

5. The method of solution 1, wherein the portion corresponds to a region having a width that is equal to a maximum of VSize and a width of the video block, where VSize represents a size of a virtual pipeline data unit.

6. The method of solution 1, wherein the portion corresponds to a region having a height that is equal to a maximum of VSize and a height of the video block, where VSize represents a size of a virtual pipeline data unit.

The following solutions show example embodiments of techniques discussed in the previous section (e.g., item 2).

7. A method of video processing, comprising: performing a conversion between one or more video blocks of a video and a coded representation of the video, wherein the one or more video blocks are coded using a palette of representative samples, wherein the palette is predictively coded in the coded representation using a palette predictor, and wherein the palette predictor is updated prior to use for processing each of the one or more video blocks.

8. The method of solution 7, wherein the palette predictor is updated using information from a previous video block of the one or more video blocks.

9. The method of solution 7, wherein the palette predictor is updated using a previously palette predictor with the same entry.

10. The method of any of solutions 7-9, wherein the coded representation includes a field indicative of a difference between the palette predictor and an updated value of the palette predictor.

11. The method of any of solutions 1 to 17, wherein the conversion comprises encoding the video into the coded representation.

12. The method of any of solutions 1 to 17, wherein the conversion comprises decoding the coded representation to generate pixel values of the video.

13. A video decoding apparatus comprising a processor configured to implement a method recited in one or more of solutions 1 to 19.

14. A video encoding apparatus comprising a processor configured to implement a method recited in one or more of solutions 1 to 19.

15. A computer program product having computer code stored thereon, the code, when executed by a processor, causes the processor to implement a method recited in any of solutions 1 to 19.

16. A method, apparatus or system described in the present document.

A listing of a second set of solutions preferably implemented by some embodiments is listed in the following examples.

1. A video processing method (e.g., method 1200 in FIG. 12), comprising: determining (1202), for a conversion between a video block of a video and a bitstream of the video, that the video block satisfies a condition, wherein the video block is coded in the bitstream using an intra block copy mode; and performing (1204) the conversion based on the determining; wherein, due to the video block satisfying the condition, a portion of an intra block copy buffer is resetted during the conversion.

2. The method of example 1, wherein the portion comprises all corresponding virtual pipeline data units (VPDUs) in the intra block copy buffer.

3. The method of example 2, wherein the corresponding VPDUs overlap with the video block in the intra block copy buffer.

4. The method of any of examples 2-3, wherein the VPDUs are resetted to a value equal to −1.

5. The method of example 1, wherein the portion corresponds to a region having a width that is equal to a maximum of VSize and a width of the video block, where VSize represents a size of a virtual pipeline data unit.

6. The method of example 1, wherein the portion corresponds to a region having a height that is equal to a maximum of VSize and a height of the video block, where VSize represents a size of a virtual pipeline data unit.

7. The method of any of examples 1-6, wherein, using the intra block copy mode, a prediction is derived from blocks of sample values of a same decoded slice as determined by block vectors corresponding to the video block.

Figure 11:
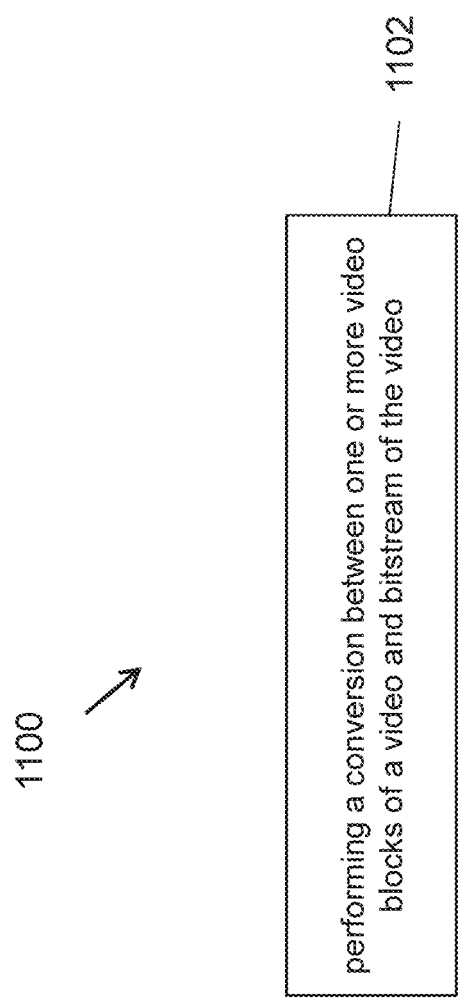
FIG. 11 is a flowchart for an example method of video processing.

8. A method of video processing (e.g., method 1100 in FIG. 11), comprising: performing (1102) a conversion between one or more video blocks of a video and bitstream of the video, wherein the one or more video blocks are coded using a palette of representative samples, wherein the palette is predictively coded in the bitstream using a palette predictor, and wherein the palette predictor is updated prior to use for processing each of the one or more video blocks.

9. The method of example 8, wherein the palette predictor is updated using information from a previous video block that is coded previous to the one or more video blocks.

10. The method of example 8, wherein the palette predictor is updated using a previously palette predictor with the same entry.

11. The method of any of examples 8-10, wherein the bitstream includes a field indicative of a difference between the palette predictor and an updated value of the palette predictor.

12. The method of any of examples 1 to 11, wherein the performing the conversion includes encoding the video block into the bitstream.

13. The method of any of examples 1 to 11, wherein the performing the conversion comprises generating the bitstream based on the video, and the method further comprises storing the bitstream in a non-transitory computer-readable recording medium.

14. The method of any of examples 1 to 11, wherein the performing the conversion comprises decoding the video from the bitstream.

15. A video decoding apparatus comprising a processor configured to implement a method recited in one or more of examples 1 to 11.

16. A video encoding apparatus comprising a processor configured to implement a method recited in one or more of examples 1 to 11.

17. A computer program product having computer instructions stored thereon, the instructions, when executed by a processor, causes the processor to implement a method recited in any of examples 1 to 14.

18. A non-transitory computer-readable storage medium that stores a bitstream generated according to the method in any one of examples 1 to 11.

19. A non-transitory computer-readable storage medium storing instructions that cause a processor to implement a method recited in any of examples 1 to 14.

20. A method of bitstream generation, comprising: generating a bitstream of a video according to a method recited in any of examples 1 to 11, and storing the bitstream on a computer-readable program medium.

21. A method, an apparatus, a bitstream generated according to a disclosed method or a system described in the present document In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
determining, for a conversion between a video block of a video picture of a video and a bitstream of the video, that a first prediction mode is applied to the video block;
maintaining, for the first prediction mode, a virtual buffer comprising reference samples derived from the video picture, wherein in the first prediction mode, prediction samples of the video block are derived from the reference samples in the virtual buffer as determined by a block vector; and
performing the conversion based on the determining,
wherein the reference samples in a first region of the virtual buffer are set to be −1 and are unavailable for deriving the prediction samples,
wherein the first region maps to a second region of the video picture, and
wherein when a width of the video block is greater than a size of a virtual unit, a width of the second region is equal to the width of the video block, and when a width of the video block is less than a size of a virtual unit, a width of the second region is equal to a width of the virtual unit.

2. The method of claim 1, wherein when a height of the video block is greater than a size of a virtual unit, a height of the second region is equal to the height of the video block.

3. The method of claim 1, wherein an upper-left corner of the second region is an upper-left corner of the virtual unit.

4. The method of claim 1, wherein when a height of the video block is less than a size of a virtual unit, a height of the second region is equal to a height of the virtual unit.

5. The method of claim 1, wherein a location of (x, y) in the second region is mapped to a location of (((x+(IbcBufWidthY>>1))% IbcBufWidthY), (y % CtbSizeY)) in the first region.

6. The method of claim 1, wherein the conversion includes encoding the video block into the bitstream.

7. The method of claim 1, wherein the conversion comprises decoding the video from the bitstream.

8. An apparatus for processing video data comprising a processor and a non-transitory memory with instructions thereon, wherein the instructions upon execution by the processor, cause the processor to:
determine, for a conversion between a video block of a video picture of a video and a bitstream of the video, that a first prediction mode is applied to the video block;
maintain, for the first prediction mode, a virtual buffer comprising reference samples derived from the video picture, wherein in the first prediction mode, prediction samples of the video block are derived from the reference samples in the virtual buffer as determined by a block vector; and
perform the conversion based on the determination,
wherein the reference samples in a first region of the virtual buffer are set to be −1 and are unavailable for deriving the prediction samples,
wherein the first region maps to a second region of the video picture,
wherein when a width of the video block is greater than a size of a virtual unit, a width of the second region is equal to the width of the video block, and when a width of the video block is less than a size of a virtual unit, a width of the second region is equal to a width of the virtual unit.

9. The apparatus of claim 8, wherein when a height of the video block is greater than a size of a virtual unit, a height of the second region is equal to the height of the video block.

10. The apparatus of claim 8, wherein an upper-left corner of the second region is an upper-left corner of the virtual unit.

11. The apparatus of claim 8, wherein when a height of the video block is less than a size of a virtual unit, a height of the second region is equal to a height of the virtual unit.

12. The apparatus of claim 8, wherein a location of (x, y) in the second region is mapped to a location of (((x+(IbcBufWidthY>>1))% IbcBufWidthY), (y % CtbSizeY)) in the first region.

13. A non-transitory computer-readable storage medium storing instructions that cause a processor to:
determine, for a conversion between a video block of a video picture of a video and a bitstream of the video, that a first prediction mode is applied to the video block;
maintain, for the first prediction mode, a virtual buffer comprising reference samples derived from the video picture, wherein in the first prediction mode, prediction samples of the video block are derived from the reference samples in the virtual buffer as determined by a block vector; and
perform the conversion based on the determination,
wherein the reference samples in a first region of the virtual buffer are set to be −1 and are unavailable for deriving the prediction samples,
wherein the first region maps to a second region of the video picture,
wherein when a width of the video block is greater than a size of a virtual unit, a width of the second region is equal to the width of the video block, and when a width of the video block is less than a size of a virtual unit, a width of the second region is equal to a width of the virtual unit.

14. The non-transitory computer-readable storage medium of claim 13, wherein when a height of the video block is greater than a size of a virtual unit, a height of the second region is equal to the height of the video block.

15. The non-transitory computer-readable storage medium of claim 13, wherein an upper-left corner of the second region is an upper-left corner of the virtual unit.

16. The non-transitory computer-readable storage medium of claim 13,
wherein when a height of the video block is less than a size of a virtual unit, a height of the second region is equal to a height of the virtual unit.

17. The non-transitory computer-readable storage medium of claim 13, wherein a location of (x, y) in the second region is mapped to a location of (((x+(IbcBufWidthY>>1))% IbcBufWidthY), (y % CtbSize Y)) in the first region.

18. A non-transitory computer-readable recording medium storing a bitstream of a video which is generated by a method performed by a video processing apparatus, wherein the method comprises:
determining, for a video block of a video picture of the video, that a first prediction mode is applied to the video block;
maintaining, for the first prediction mode, a virtual buffer comprising reference samples derived from the video picture, wherein in the first prediction mode, prediction samples of the video block are derived from the reference samples in the virtual buffer as determined by a block vector; and
generating the bitstream based on the determining,
wherein the reference samples in a first region of the virtual buffer are set to be −1 and are unavailable for deriving the prediction samples,
wherein the first region maps to a second region of the video picture,
wherein when a width of the video block is greater than a size of a virtual unit, a width of the second region is equal to the width of the video block, and when a width of the video block is less than a size of a virtual unit, a width of the second region is equal to a width of the virtual unit.

19. The non-transitory computer-readable recording medium of claim 18, wherein when a height of the video block is greater than a size of a virtual unit, a height of the second region is equal to the height of the video block,
wherein an upper-left corner of the second region is an upper-left corner of the virtual unit,
wherein when a height of the video block is less than a size of a virtual unit, a height of the second region is equal to a height of the virtual unit, and
wherein a location of (x, y) in the second region is mapped to a location of (((x+(IbcBufWidthY>>1))% IbcBufWidthY), (y % CtbSize Y)) in the first region.

* * * * *